(12) United States Patent
Wang et al.

(10) Patent No.: US 10,476,111 B2
(45) Date of Patent: Nov. 12, 2019

(54) COMPOSITE ELECTRODE FOR AQUEOUS RECHARGEABLE ZINC ION BATTERIES

(71) Applicant: Wisconsin Alumni Research Foundation, Madison, WI (US)

(72) Inventors: Xudong Wang, Middleton, WI (US);
Qiang Pang, Madison, WI (US);
Yingjin Wei, Changchun (CN)

(73) Assignee: Wisconsin Alumni Research Foundation, Madison, WI (US)

(*) Notice: Subject to any disclaimer, the term of this patent is extended or adjusted under 35 U.S.C. 154(b) by 65 days.

(21) Appl. No.: 15/810,903

(22) Filed: Nov. 13, 2017

(65) Prior Publication Data
US 2019/0148779 A1 May 16, 2019

(51) Int. Cl.
| | |
|---|---|
| *H01M 10/36* | (2010.01) |
| *H01M 4/36* | (2006.01) |
| *H01M 4/38* | (2006.01) |
| *H01M 4/48* | (2010.01) |
| *H01M 4/62* | (2006.01) |
| *H01M 4/02* | (2006.01) |

(52) U.S. Cl.
CPC .......... *H01M 10/36* (2013.01); *H01M 4/362* (2013.01); *H01M 4/38* (2013.01); *H01M 4/48* (2013.01); *H01M 4/624* (2013.01); *H01M 2004/028* (2013.01); *H01M 2300/0002* (2013.01)

(58) Field of Classification Search
CPC ............... H01M 10/36; H01M 4/362; H01M 2004/028; H01M 2300/0002
See application file for complete search history.

(56) References Cited

U.S. PATENT DOCUMENTS

2017/0207492 A1  7/2017  Adams et al.
2017/0250449 A1  8/2017  Adams et al.

OTHER PUBLICATIONS

Abraham, "Characherization of Ether Electrolytes for Regargeable Lithium Cells" Electrochemical Science, 1987.*
Li et al., Characteristics of the electrolyte containing ethylene carbonate and dimethyl carbonate in zinc-polyaniline battery, Int. J. Electrochem. Sci. 11, Feb. 1, 2016, pp. 1898-1906.
Li et al., Single-crystal $H_2V_3O_8$ nanowires: a competitive anode with large capacity for aqueous lithium-ion batteries, J. Mater. Chem. 21, Nov. 26, 2010, pp. 1780-1787.

(Continued)

*Primary Examiner* — Matthew T Martin
(74) *Attorney, Agent, or Firm* — Bell & Manning, LLC; N. Meredith Porembski

(57) ABSTRACT

An aqueous rechargeable zinc ion battery is provided, the battery comprising a cathode comprising a $V_3O_7 \cdot H_2O$-graphene composite, the composite comprising a plurality of $V_3O_7 \cdot H_2O$ nanostructures in contact with graphene, an anode in electrical communication with the cathode, the anode comprising zinc, and an aqueous electrolyte between the cathode and the anode, the aqueous electrolyte comprising zinc ions and an ether of a type and at an amount selected to maximize a capacity retention value of the battery.

16 Claims, 21 Drawing Sheets

(56) References Cited

OTHER PUBLICATIONS

Qiao et al., Synthesis of $V_3O_7$ $H_2O$ nanobelts as cathode materials for lithium-ion batteries, Electrochemistry Communications 8, Nov. 15, 2005, pp. 21-26.
Senguttuvan et al., A High Power Rechargeable Nonaqueous Multivalent $Zn/V_2O_5$ Battery, Advanced Energy Materials, Aug. 2016.
Kundu et al., A high-capacity and long-life aqueous rechargeable zinc battery using a metal oxide intercalation cathode, Nature Energy, Aug. 26, 2016.
Zhu et al., Synthesis of H2V3O8/Reduced Graphene Oxide Composite as a Promising Cathode Material for Lithium-Ion Batteries, ChemPlusChem 79, Jan. 31, 2014, pp. 447-453.

* cited by examiner

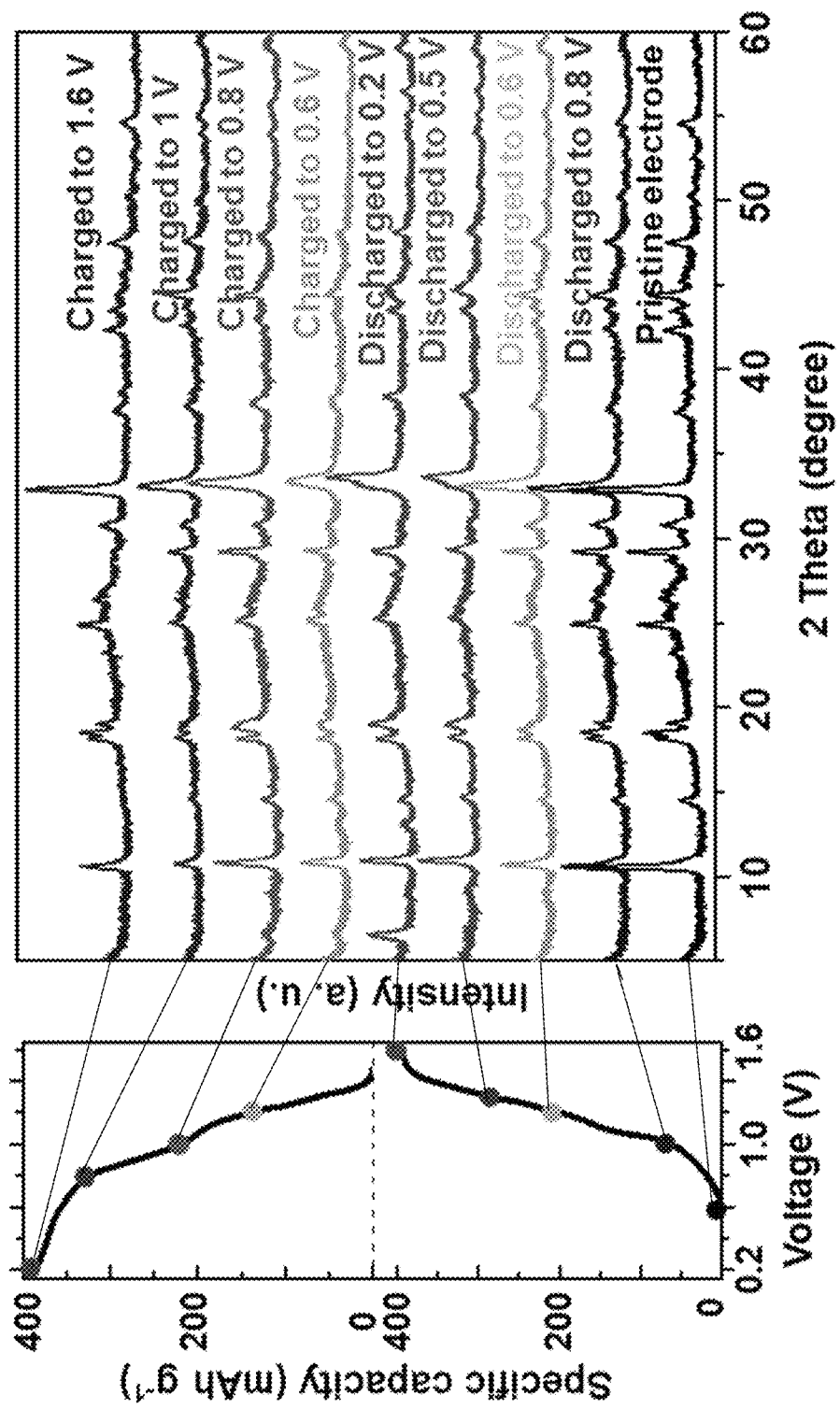

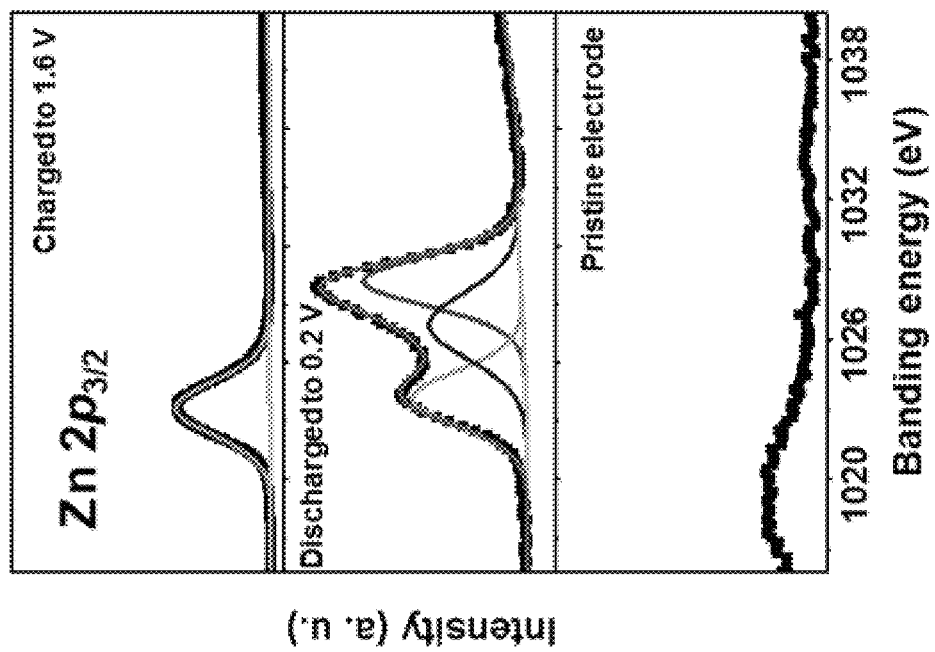

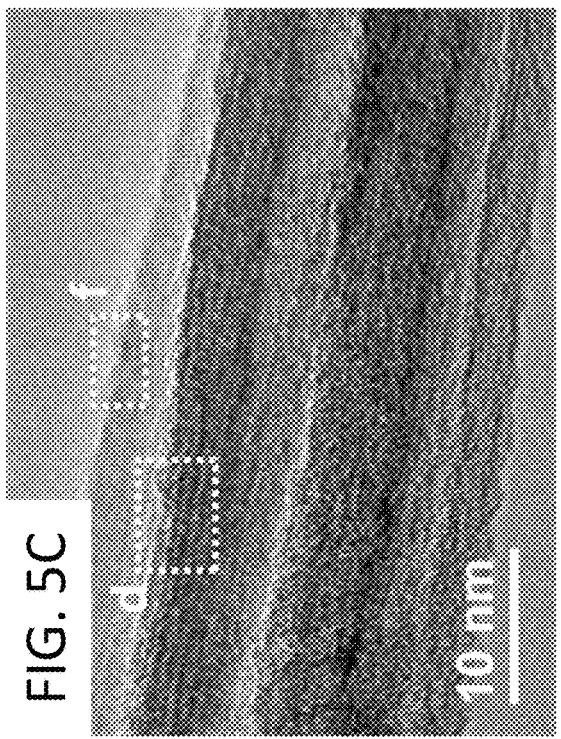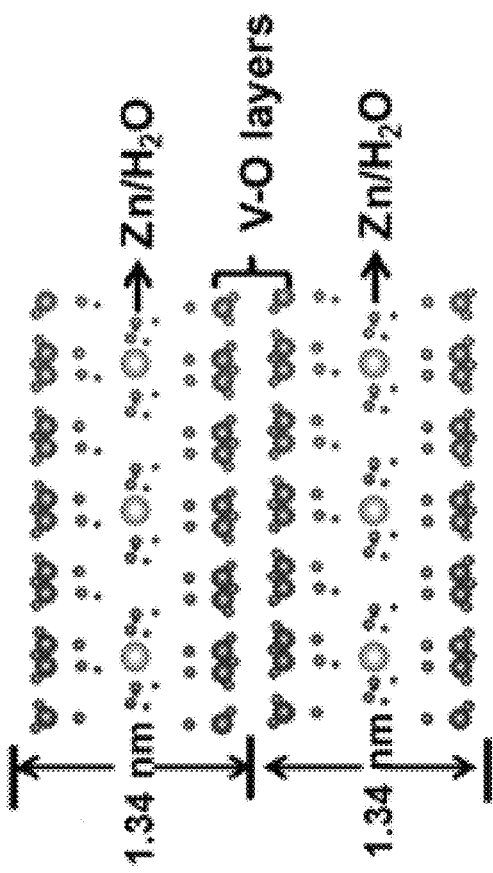
FIG. 5C   FIG. 5D   FIG. 5E

COMPOSITE ELECTRODE FOR AQUEOUS RECHARGEABLE ZINC ION BATTERIES

REFERENCE TO GOVERNMENT RIGHTS

This invention was made with government support under DE-SC0008711 awarded by the US Department of Energy. The government has certain rights in the invention.

BACKGROUND

The harvesting and utilization of clean and renewable energy, such as energy from solar and wind, have experienced a rapid evolution. Implementation of these intermittent energy resources requires large-scale energy storage systems to store and regulate the power output among peak and off-peak hours. As the most popular electrochemical energy storage device, lithium ion batteries (LIBs) are considered to be the most promising candidate due to their high energy density. However, in such large-scale applications, cost, lifetime and safety are particularly important factors to be considered.[1] Compared to expensive and flammable non-aqueous LIBs, aqueous batteries with water-based electrolyte possess a natural advantage in these areas. Furthermore, they do not require strict oxygen- and water-controlled manufacturing environments and thus have much lower fabrication costs.

The development of aqueous battery systems has progressed rapidly in recent years, including monovalent $Li^+$, $Na^+$ and $K^+$ and divalent $Mg^{2+}$ and $Zn^{2-}$ systems.[2] Among them, aqueous rechargeable zinc ion batteries (ARZIBs) have attracted much attention due to the low price, rich global distribution, high stability, relatively low redox potential, and high theoretic capacity (825 mAh $g^{-1}$) of zinc metal. These merits of ARZIBs have substantially raised their application potential in large-scale energy storage systems and even in electric vehicles. Most recently, $\alpha$-$MnO_2$, $\beta$-$MnO_2$ and $Zn_{0.25}V_2O_5 \cdot nH_2O$ nanofibers have been applied to ARZIBs.[2e-2g]

Although ARZIBs have been the focus of recent research, the lack of suitable cathode materials is a significant challenge to their commercial development. Although the radius of $Zn^{2+}$ ions (0.74 Å) is almost the same as that of $Li^+$ ions (0.76 Å), the larger atomic mass and stronger positive polarity result in poorer transport kinetics and lower solid-state solubility in bulk electrode. Thus, most electrode materials that can accommodate $Li^+$ ions insertion/extraction are not suitable for ARZIBs. Only a few cathode materials have been demonstrated in a laboratory and most deliver limited specific capacities, poor rate capability and/or bad cycling performance.[3]

SUMMARY

The present disclosure provides aqueous rechargeable zinc ion batteries.

One embodiment of an aqueous rechargeable zinc ion battery comprises a cathode comprising a $V_3O_7 \cdot H_2O$-graphene composite, the composite comprising a plurality of $V_3O_7 \cdot H_2O$ nanostructures in contact with graphene, an anode in electrical communication with the cathode, the anode comprising zinc, and an aqueous electrolyte between the cathode and the anode, the aqueous electrolyte comprising zinc ions and an ether of a type and at an amount selected to maximize a capacity retention value of the battery.

Another embodiment of an aqueous rechargeable zinc ion battery comprises a cathode comprising a $V_3O_7 \cdot H_2O$-graphene composite, the composite comprising a plurality of $V_3O_7 \cdot H_2O$ nanowires in contact with graphene, an anode in electrical communication with the cathode, the anode comprising zinc, and an aqueous electrolyte between the cathode and the anode, the aqueous electrolyte comprising zinc ions and an ether at an amount in a range of from 1 vol. % to 20 vol. %.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 1A is an SEM image showing the morphology of the as-prepared $H_2V_3O_8$/graphene composite. FIG. 1B is an SEM image depicting the intimate distribution of $H_2V_3O_8$ NWs and graphene film. FIG. 1C is a schematic illustration of the structure of the composite. FIG. 1D is a TEM image showing the uniform distribution of $H_2V_3O_8$ NWs on graphene films. FIG. 1E is a TEM image showing the rectangular shape of the NWs with a curved tip surface. FIG. 1F is an HRTEM image of the NW tip showing the single-crystalline lattice of $H_2V_3O_8$. The inset is the corresponding fast fourier transform (FFT) image.

FIG. 2A shows the galvanostatic charge-discharge profiles of the $H_2V_3O_8$/graphene cathode at a 1/3 C rate. FIG. 2B depicts the cycling performance and the corresponding coulombic efficiency at a 1 C rate after 3 cycles of activation at 1/3 C rate. FIG. 2C shows rate capability at varying C rates. FIG. 2D shows galvanostatic charge-discharge profiles at different C rates. FIG. 2E shows long cycling stability at a 20 C rate. FIG. 2F depicts a comparison of the energy and power density of the $H_2V_3O_8$ NW/graphene cathode with other reported materials for ARZIBs.

FIGS. 3A-3C show results after 150 cycles at 1/3 C rate. FIGS. 3D-3F show results after 2000 cycles at 20 C rate. FIGS. 3A and 3D are SEM images showing the morphology of the electrode after 150 cycles at a 1/3 C rate. FIGS. 3B and 3E are SEM images showing the graphene conductive network in the electrode. FIGS. 3C and 3F are HRTEM images of the $H_2V_3O_8$ NW crystals.

FIGS. 4A-4F show the spectroscopy investigation of the electrochemical reaction mechanism. FIG. 4A shows the charge/discharge curve of the first operation cycle. Sampling points for XRD and Raman characterizations were marked with corresponding dots. FIG. 4B shows an ex-situ XRD measurement during the first electrochemical cycle showing the reversible evolution of the $H_2V_3O_8$ NW crystal structure. FIG. 4C shows the Raman spectrum in the wavelength range of 50-1200 $cm^{-1}$ of the electrodes. FIGS. 4D-4F show a comparison of the XPS of different elements in the composite electrode when charged to 1.6 V (top panel), discharged to 0.2 V (middle panel) and as pristine (bottom panel), for Zn (FIG. 4D), O (FIG. 4E), and V (FIG. 4F) elements. Experimental data are shown by black lines; overall fitted data are shown by pink lines; and fitted individual peaks are shown by other colors.

FIGS. 5A-5J depict an atomic-level study of the $Zn^{2+}$ intercalation in $H_2V_3O_8$ NWs. FIG. 5A depicts EELS mapping of a pristine $H_2V_3O_8$ NW. The white box shows the region used for EELS mapping (a1). a2, the V element. a3, the O element. a4, no Zn element signal was detected in the NW. FIG. 5B depicts EELS mapping of a zinc-intercalated $H_2V_3O_8$ NW discharged to 0.2 V. The white box shows the region used for EELS mapping (b1). b2, the V element. b3, the O element. b4, The Zn element. FIG. 5C is a TEM image of a $H_2V_3O_8$ NW discharged to 0.2 V. FIG. 5D is an HRTEM image of the new phase within the NW. Inset is the intensity profile along the dashed line. FIG. 5E is a schematic illustration of the bilayered $Zn_xV_2O_5 \cdot nH_2O$ structure. FIG. 5F shows a HRTEM image of the unchanged $H_2V_3O_8$ phase region. FIG. 5G shows a high-precision HAADF STEM image of a $H_2V_3O_8$ NW discharged to 0.2 V. FIG. 5H shows an intensity line scan along the white dashed line in the HAADF image (FIG. 5C). FIGS. 5I and 5J show potential intercalated Zn sites in the $H_2V_3O_8$ crystal viewed along the [100] direction (FIG. 5E) and along the [001] direction (FIG. 5F).

DETAILED DESCRIPTION

Figure 1A:
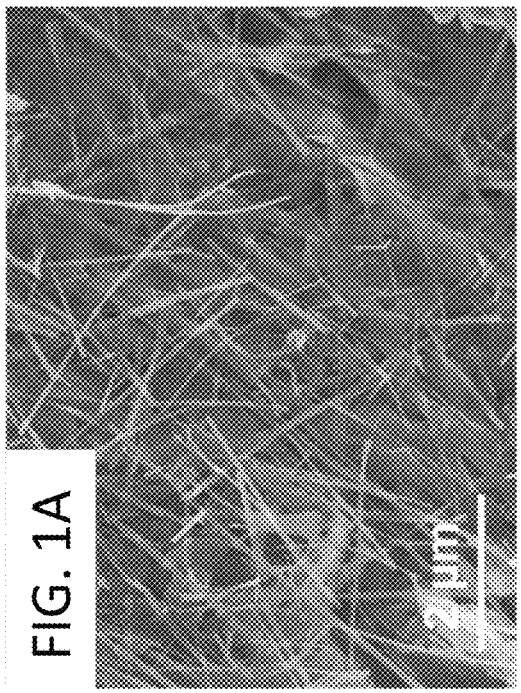
FIGS. 1A-1F depict electron microscopy characterization of the $H_2V_3O_8$ NW/graphene composite.

The present disclosure provides aqueous rechargeable zinc ion batteries. In an embodiment, an aqueous rechargeable zinc ion battery comprises a cathode comprising a $V_3O_7 \cdot H_2O$-graphene composite, an anode in electrical communication with the cathode, and an aqueous electrolyte between the cathode and the anode. At least some embodiments of the batteries are characterized by superior specific capacities, rate capabilities and cycling performance as compared to conventional aqueous rechargeable zinc ion batteries.

The composite of the battery comprises nanostructured $V_3O_7 \cdot H_2O$ and graphene. By "nanostructured," it is meant that the $V_3O_7 \cdot H_2O$ material has nanoscale morphology exhibiting structural feature(s) on the order of about 100 nm or less. The type of nanostructure is not particularly limited. In embodiments, the $V_3O_7 \cdot H_2O$ is in the form of nanowires, elongated nanostructures each having a length l which is significantly greater than the other two dimensions of the nanowire. These other two dimensions may have similar magnitudes in which case the dimensions perpendicular to the length l may be referred to as a diameter d. However, the cross-sectional shape of the nanowire is not limited to a circular shape. The length l and diameter d are also not particularly limited. These dimensions may be reported as an average value as determined from a representative number of nanowires. In embodiments, the nanowires are characterized by an average length l having a value in the range of from about 1 μm to about 10 μm, from about 2 μm to about 8 μm, or from about 3 μm to about 5 μm. In embodiments, the nanowires are characterized by an average diameter d having a value in the range of from about 1 nm to about 250 nm, from about 10 nm to about 200 nm, or from about 50 nm to about 100 nm. The dimensions may be determined from SEM images. (See FIGS. 1A, 1B.) Other types of nanostructures include nanoparticles, nanorods, nanotubes, nanosheets, nanoflakes, and nanospheres.

The $V_3O_7 \cdot H_2O$ nanostructures may be characterized as being single-crystalline by which it is meant that the lattice structure throughout the nanostructures as determined from HRTEM images (see FIG. 1F) is closest to that of a single-crystal phase.

The composite of the battery also comprises graphene in contact with the $V_3O_7 \cdot H_2O$ nanostructures. By "in contact" it is meant that surface(s) of the $V_3O_7 \cdot H_2O$ nanostructures are sufficiently close (e.g., in direct contact) to graphene surfaces(s) to facilitate the transport of electrons between the two types of materials. The contact may involve the formation of chemical bonds between the $V_3O_7 \cdot H_2O$ nanostructures and the graphene. The distribution of the $V_3O_7 \cdot H_2O$ nanostructures within the graphene (and vice versa) may be homogeneous by which it is meant that discrete regions within the composite have approximately equal ratios of nanostructures:graphene. (See FIG. 1A, 1B, 1D.) However, this does not mean that the distribution is perfectly homogenous. When the $V_3O_7 \cdot H_2O$ nanostructures are in the form of nanowires (or similar elongated nanostructures), the nanowires may be aligned with their lengths approximately parallel to the graphene surface(s) with which they are associated. (See FIG. 1C, 1D.) However, this does not mean that the orientation is perfectly parallel. Otherwise, as shown in FIGS. 1A-1D, the orientation of the nanowires with respect to the graphene surfaces (and with respect to one another) is random. The nature of the association between graphene and the $V_3O_7 \cdot H_2O$ nanostructures may be determined from SEM and TEM images.

The relative amount of graphene and $V_3O_7 \cdot H_2O$ nanostructures in the composite may vary and may be adjusted to optimize battery performance (i.e., capacity, rate capability, capacity retention, etc.). In embodiments, the amount of graphene in the composite is in the range of from about 1% to about 30% by weight as compared to the total weight of the composite. This includes embodiments in which the amount of graphene is in the range of from about 1% to about 20%, from about 1% to about 10%, from about 2% to about 8%, or from about 3% to about 5%.

The $V_3O_7 \cdot H_2O$-graphene composite may be combined with other cathode materials. By way of illustration, an additional conductive material, e.g., carbon black, may be used. A polymeric binder, e.g., polyvinylidene difluoride (PVDF), may be used. The types of additional conductive material and/or polymeric binder are not particularly limited. The relative amounts of the composite, the additional conductive material and the polymeric binder may be adjusted to optimize battery performance. Illustrative suitable amounts are provided in the Example below.

The $V_3O_7 \cdot H_2O$-graphene composite and if present, the other cathode materials, may be provided on an electrically conductive support. A variety of conductive supports may be used, e.g., a metal foil such as Ti foil. Carbon-based materials or foils may be used, e.g., a graphite foil or a graphene film.

The anode comprises zinc. However, the form of the zinc is not particularly limited, e.g., the form may be as a film, foil, etc. The anode may be composed entirely of zinc or the zinc may be provided on an electrically conductive support.

The aqueous electrolyte comprises water and a zinc salt. The type of zinc salt, its concentration and the pH of the aqueous electrolyte are not particularly limited. An illustrative aqueous electrolyte is described in the Example below. Other illustrative zinc salts include $Zn(CF_3SO_3)_2$, $ZnSO_4$, $Zn(NO_3)_2$ and $Zn(ClO_4)_2$. The zinc salt dissolves in the aqueous electrolyte to provide zinc ions. The pH of the aqueous electrolyte may be, e.g., less than 7, less than 5, in the range of from about 1 to about 5 or from about 3 to about 5.

The battery may include an ether, e.g., within the aqueous electrolyte, of a type and in an amount selected to maximize the capacity retention of the battery. By "maximize" it is meant that the capacity retention is increased to an approximately maximum value as measured as set forth in "Electrochemical measurements" in the Example below, using the electrochemical cell configuration and conditions described therein. This does not mean that the capacity retention has to be at the perfect maximum, but may be within, e.g., ±10%, ±5% or ±2% of the maximum value. The inventors have found that certain water-soluble ethers (e.g., diethyl ether, dimethyl ether, and tetrahydrofuran) when present within the aqueous electrolyte in amounts of 5 vol. % to 10 vol. % significantly improve the capacity retention of the present batteries as compared to the same batteries without the ether. By "vol. %" it is meant the volume percent of the ether as compared to the total volume of the aqueous electrolyte. In other embodiments, the ether is present in the aqueous electrolyte, but the amount is no more than 20 vol. %, no more than 18 vol. %, no more than 16 vol. %, no more than 14 vol. %, or no more than 12 vol. %. In embodiments, the ether is not tetraethylene glycol dimethyl ether. In embodiments, the ether is not diethylene glycol dimethyl ether.

Figure 6:
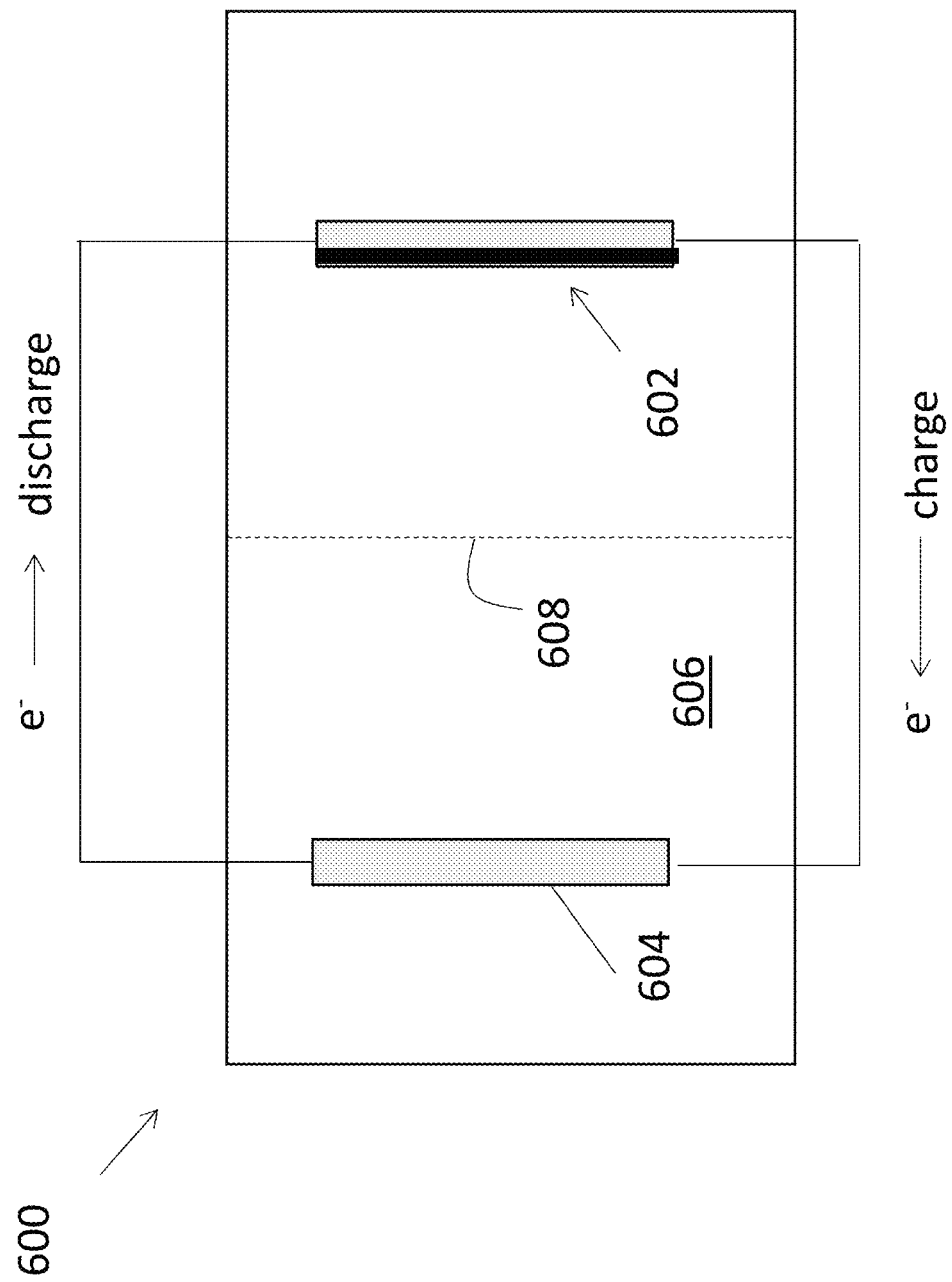
FIG. 6 is a schematic illustration of an aqueous rechargeable zinc ion battery according to an illustrative embodiment.

The battery may comprise additional components typically associated with aqueous rechargeable batteries, e.g., a separator between the anode and the cathode. An illustrative battery is shown in FIG. 6.

Illustrative methods for forming the $V_3O_7 \cdot H_2O$-graphene composite and the aqueous rechargeable zinc batteries are provided in the Example below.

The battery may be characterized by a variety of properties, including one or more of the following properties: specific capacity, energy density, rate capability, and power density. Each of these properties may be referenced with respect to a selected C-rate. A C-rate of 1 C refers to the complete discharge/charge of the battery in one hour. These properties may be measured as set forth in "Electrochemical measurements" in the Example below, using the electrochemical cell configuration and conditions described therein.

In embodiments, the battery is characterized by a specific capacity of at least 50 mAh $g^{-1}$ at 1/3 C, at least 100 mAh $g^{-1}$ at 1/3 C, at least 350 mAh $g^{-1}$ at 1/3 C, at least 375 mAh $g^{-1}$ at 1/3 C, at least 400 mAh $g^{-1}$ at 1/3 C, at least 425 mAh $g^{-1}$ at 1/3 C or in the range of from 375 mAh $g^{-1}$ to 450 mAh $g^{-1}$ at 1/3 C. In embodiments, the battery is characterized by an energy density of at least 50 Wh $kg^{-1}$ at 1/3 C, at least 100 Wh $kg^{-1}$ at 1/3 C, at least 200 Wh $kg^{-1}$ at 1/3 C, at least 225 Wh $kg^{-1}$ at 1/3 C, at least 250 Wh $kg^{-1}$ at 1/3 C, at least 275 Wh $kg^{-1}$ at 1/3 C or in the range of from 225 Wh $kg^{-1}$ to 300 Wh $kg^{-1}$ at 1/3 C. In embodiments, the battery is characterized by a rate capability of at least 50 mAh $g^{-1}$ at 20 C, at least 100 mAh $g^{-1}$ at 20 C, at least 225 mAh $g^{-1}$ at 20 C, at least 250 mAh $g^{-1}$ at 20 C, at least 275 mAh $g^{-1}$ at 20 C, at least 300 mAh $g^{-1}$ at 20 C or in the range of from 250 mAh $g^{-1}$ to 275 mAh $g^{-1}$ at 20 C. In embodiments, the battery is characterized by a power density of at least 100 W $kg^{-1}$ at 20 C, at least 500 W $kg^{-1}$ at 20 C, at least 1000 W $kg^{-1}$ at 20 C, at least 3000 W $kg^{-1}$ at 20 C, at least 3250 W $kg^{-1}$ at 20 C, at least 3500 W $kg^{-1}$ at 20 C, at least 3750 W $kg^{-1}$ at 20 C or in the range of from 3250 W $kg^{-1}$ to 4000 W $kg^{-1}$ at 20 C.

The battery may also be characterized by a capacity retention (%) at a selected rate and a selected number of cycles. In embodiments, the battery is characterized by a capacity retention of at least 60% at 20 C and after 2000 cycles, at least 75% at 20 C and after 2000 cycles, of at least 85% at 20 C and after 2000 cycles, at least 90% at 20 C and after 2000 cycles, at least 95% at 20 C and after 2000 cycles, at least 98% at 20 C and after 2000 cycles, or in the range of 85% to 95% at 20 C and after 2000 cycles.

The performance values described above may be reported with reference to room temperature (about 25° C.) and a pH in the range of 2 to 7.

A schematic of an illustrative battery is shown in FIG. 6. The battery comprises a cathode 602 comprising a $V_3O_7 \cdot H_2O$-graphene composite. In this embodiment, the $V_3O_7 \cdot H_2O$ nanostructures of the composite are nanowires and the composite is combined with carbon black and a polymeric binder. The cathode materials are deposited on an electrically conductive support. The battery 600 comprises an anode 604 (e.g., Zn foil) and an aqueous electrolyte 606 between the cathode 602 and the anode 604. In this embodiment, the aqueous electrolyte 606 comprises a zinc salt and 5 vol. % diethyl ether. The battery 600 also comprises a separator 608 between the cathode 602 and the anode 604.

The present batteries may be used as a source of power in a variety of electrical circuits comprising an electrical load or an electrical component that draws current from the battery. In their discharged state, the present batteries may be electrically connected to another power source for recharging.

In the present disclosure, the $V_3O_7 \cdot H_2O$-graphene composite of the battery is described with respect to its fully charged state (i.e., free of zinc ions). However, it is understood that the present batteries which comprise "cathodes comprising $V_3O_7 \cdot H_2O$-graphene composites" encompass the batteries in other states, e.g., a discharged state in which zinc ions may be incorporated into the $V_3O_7 \cdot H_2O$-graphene composite.

EXAMPLE

Introduction

Aqueous rechargeable zinc ion batteries are considered a promising candidate for large scale energy storage owing to their low cost and high safety nature. However, the lack of proper cathode materials with considerable specific capacity and good durability impedes practical application for these batteries. This example outlines the development of a composite material comprised of $H_2V_3O_8$ nanowires (NWs) wrapped by graphene sheets which is used as the cathode material for aqueous rechargeable zinc ion batteries. Owing to the synergistic merits and desirable structural features of $H_2V_3O_8$ NWs and the high conductivity of its graphene network, the $H_2V_3O_8$ NW/graphene composite exhibited superior zinc ions storage performance, including high capacity of 394 mAh $g^{-1}$ at 1/3 C, high rate capability of 270 mAh $g^{-1}$ at 20 C, and excellent cycling stability of up to 2000 cycles with a capacity retention of 87%. The battery offered a high energy density of 250 W h $kg^{-1}$ at 1/3 C and a high power density of 3300 W $kg^{-1}$ at 20 C. Systematic structural and elemental characterization confirmed the reversible $Zn^{2+}$ and water co-intercalation electrochemical reaction mechanism. This example demonstrates the potential of this material for designing high-performance aqueous rechargeable zinc ion batteries for grid-scale energy storage.

Experimental

Material synthesis: Graphene oxide (GO) was produced from natural graphite (<20 mm; Sigma-Aldrich) using a modified Hummers method.[29] Graphite powder (2.0 g) was added to a mixture of $H_2SO_4$ (98 wt. %, 8 mL), $K_2S_2O_8$ (1.67 g), and $P_2O_5$ (1.67 g). This mixture was kept at 80° C. for 5 h. Subsequently, the mixture was cooled to room temperature and diluted with de-ionized (DI) water (0.5 L). After being filtered and washed several times with DI water, the suspension was dried under ambient conditions. This preoxidized graphite was treated with $H_2SO_4$ (98 wt. %) in ice-water. Next, $KMnO_4$ (15.0 g) was added to the treated graphite suspension gradually with constant stirring at 35° C. for 2 h. Shortly after dilution with water (0.7 L), $H_2O_2$ (30%, 20 mL) was added to the mixture, which was then washed with HCl followed by DI water. The GO powder was finally obtained after centrifugation, copious washing with DI water, and freeze drying. For preparing the GO solution, 50 mg of the as-synthesized GO powder was dispersed in 21 mL DI water uniformly under ultrasonic for 2 h.

$H_2V_3O_8$ NWs and $H_2V_3O_8$ NW/graphene composite were prepared by a hydrothermal method. In a typical synthesis, $V_2O_5$ powder (0.364 g) was added to DI water (20 mL) and the mixture was stirred vigorously. Then, $H_2O_2$ (4 mL) was added to the solution, which was stirred constantly for another 2 h. Subsequently, 20 mL GO solution was added to 14 mL of the mixture under vigorous stirring, followed by 6 h ultra-sonication. Finally, the solutions were transferred to a 50 mL autoclave and kept in an oven at 200° C. for 5 days. The product was washed several times with ethanol and DI water, and then dried at 60° C. to obtain the $H_2V_3O_8$ NW/graphene composite material. For comparison, pristine $H_2V_3O_8$ NWs were prepared through the same hydrothermal procedure without adding the GO solution.

Characterizations: XRD (Bruker D8, Bruker, Mass., USA) was implemented to study the crystal structure. Scanning electron microscope (SEM) observations were performed on a Zeiss LEO 1530 field-emission microscope and transmission electron microscope (TEM) and high-resolution transmission electron microscope (HRTEM) measurements were conducted on a FEI TF30 microscope. Raman scattering data were collected on a Thermo Scientific FT-Raman spectrometer using an Nd-line laser source. Nitrogen adsorption-desorption isotherms were measured on a Micromeritics ASAP 2010 instrument. X-ray photoelectron spectroscopy (XPS) scan was acquired using a Thermo Scientific K-alpha XPS instrument. Scanning tunnel electron microscope (STEM) and electron energy loss spectroscopy (EELS) experiments were performed on a FEI Titan microscope with a CEOS probe aberration-corrector operated at 200 keV. The probe semi-angle is 24.5 mrad and the probe current is ~25 pA. High angle annular dark field (HAADF) STEM imaging was collected by a Fischione Model 3000 detector spanning 84 to 160 mrad in scattering angles. In these conditions the estimated probe size is less than 1 Å. EEL spectrum images were recorded with GIF 865 spectrometer, with energy dispersion of 1 eV/pixel, which allows for the simultaneous visualization of the V L, O K, and Zn L EELS edges. The energy resolution was 1.2 eV, measured from the full width at half maximum of zero-loss peak. Thermogravimetric analysis (TGA) was measured by a TA Q500 thermogravimetric analyzer. The pH of the electrolyte was measured using a PHS-300 pH meter.

Electrochemical measurements: Electrochemical experiments were performed using 2016 coin cells in the voltage window of 1.6-0.2 V and a metallic Zn foil used as the counter-electrode. The working electrode was composed of 70 wt. % active material, 20 wt. % Super P conductive additive, and 10 wt. % polyvinylidene difluoride (PVDF) binder, and was coated on a Ti foil current collector. The electrode was cut into pieces 5×5 $mm^2$ in size and loaded with ~1.0 mg of active material. The working and counter electrodes were separated by a Whatman GF/C glass fiber filter. The electrolyte was 3 M $Zn(CF_3SO_3)_2$ aqueous solution (pH=3.55) because much better electrochemical performance has been discovered from the $Zn(CF_3SO_3)_2$ electrolyte compared to other Zn salts such as $ZnSO_4$, $Zn(NO_3)_2$ and $Zn(ClO_4)_2$.[2f, 11a] 5 vol. % diethyl ether was added. Galvanostatic charge-discharge cycling was performed on a Land-2100 battery tester. Electrochemical impedance spectroscopy (EIS) was obtained by applying an AC voltage of 10 mV in the frequency range from 1 MHz to 1 Hz using an Autolab PGSTAT302N station. The electrodes for XRD and XPS measurements were prepared by grinding 70 wt. % active material, 20 wt. % Super P conductive additive and 10 wt. % PTFE binder and rolling to a sheet. The sheet was cut into 5×5 $mm^2$ pieces and loaded with ~1.0 mg of active material. Before the X-ray diffraction (XRD) and XPS measurements, the free-standing electrodes at different charge/discharged stages were immersed and washed thoroughly in DI water and dried at 60° C. in air.

Density functional theory (DFT) calculations: DFT calculations were performed with the Vienna Ab-initio Simulation Package (VASP) using a plane wave basis set, the GGA-Perdew-Burke-Ernzerhof (PBE) exchange-correlation functional and the projector augmented wave (PAW) method. Rotationally invariant in GGA+U was employed[4] to correct the strong electronic correlation among localized V 3d electrons. (A. B. Yankovich, B. Berkels, W. Dahmen, P. Binev, S. I. Sanchez, S. A. Bradley, A. Li, I. Szlufarska, P. M. Voyles, *Nat. Commun.* 2014, 5, 4155.) Parameters $U_{eff}$=U−J=3.25 eV were used. The same $U_{eff}$ was applied on Zn. The charge state of Zn is assumed to be +2, which is achieved by a homogenous charge background in the calculation. In DFT calculations, 2×1×1 104 atom supercell was used with kinetic energy cutoff of 520 eV and 4×4×2 Monkhorst-Pack k-mesh. The Hellmann-Feynman forces were converged to 0.001 eV/Å. This DFT relaxation gave the potential ground state of Zn position at the global energy minimum. In the real case, particularly during fast electrochemical reactions at relatively low temperature, $Zn^{2+}$ ions can be kinetically trapped at neighboring local minimums. Therefore, this DFT calculation cannot give precise atomic location of the kinetically stabilized system. Instead, it provides a support to valid the interaction sites of $Zn^{2+}$ ions.

Results and Discussion

Characterization of $H_2V_3O_8$ NW/Graphene Composite.

Figure 1B:
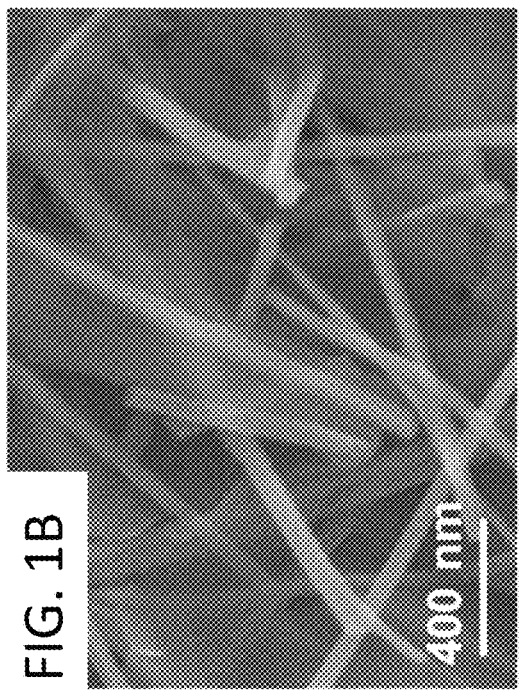
Figure 1C:
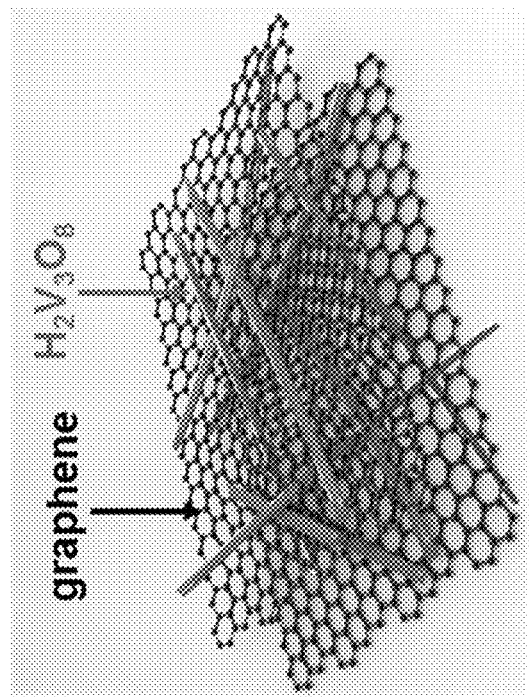
Figure 1E:
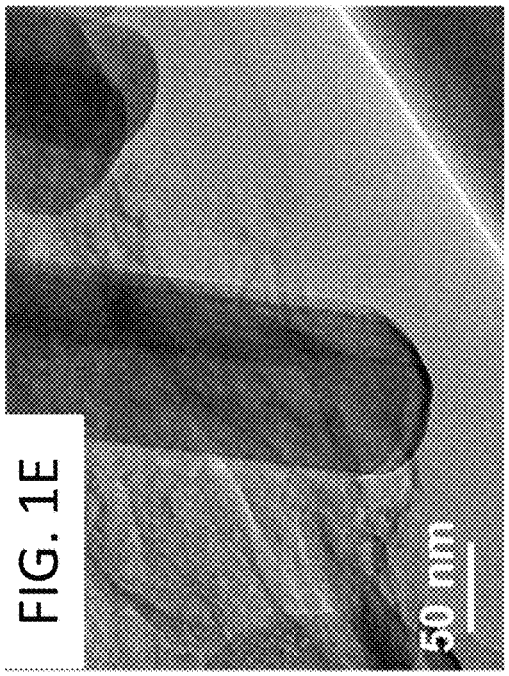
Figure 1D:
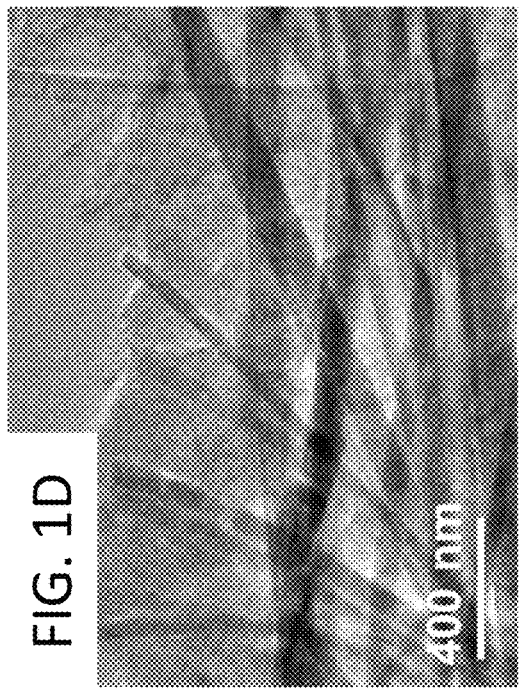
Figure 1F:
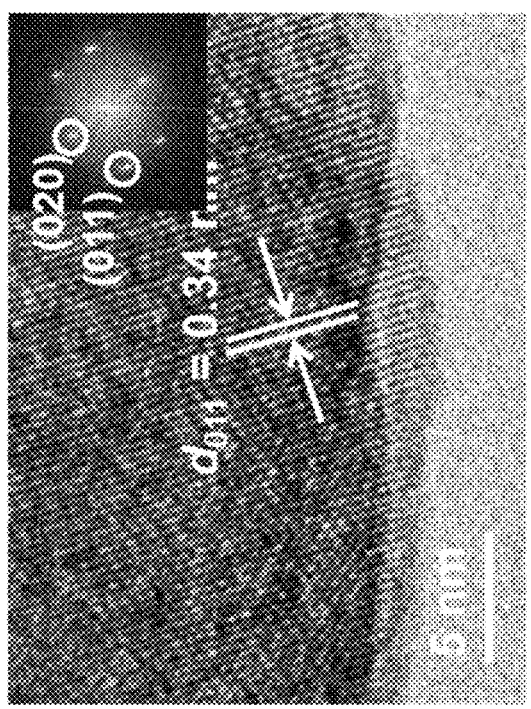

$H_2V_3O_8$ NW/graphene composite was synthesized via a single-step hydrothermal method (see experimental details in the Method section). The crystallography of the composite was first studied by XRD, where the characteristic peaks matched well to the orthorhombic crystalline phase of $H_2V_3O_8$ (space group: *Pnam*, JCPDS No. 85-2401, data not shown). No peaks from impurities of other vanadium oxides could be detected, indicating the high phase purity of the as-synthesized NWs. SEM images show the morphology and microstructure of the composite (FIGS. 1A and 1B). $H_2V_3O_8$ NWs exhibited uniform sizes and a large aspect ratio, with lengths of 3-5 μm and diameters of 50-100 nm. Graphene sheets were well blended within the randomly oriented NWs, forming a homogeneous mixture. The C 1s XPS spectra of $H_2V_3O_8$ NW/graphene exhibited fewer oxygen-containing functional groups compared to graphene oxide (GO) (data not shown), confirming the reduction of GO to graphene.[10] This architecture ensured large contact and minimal charge traveling distance between $H_2V_3O_8$ NWs and graphene (FIG. 1C), which were favorable for optimizing the charge transport properties of the composite. TEM images further revealed the $H_2V_3O_8$ NWs were anchored intimately on the graphene surface (FIG. 1D). Each NW exhibited a uniform contrast showing high-quality crystallinity and no indication of additives or impurities (FIG. 1E). A HRTEM image of the $H_2V_3O_8$ NW displayed a clear single-crystal lattice with sharp edges, and no amorphous layer could be observed on the NW surface (FIG. 1F). The corresponding fast Fourier-transform (FFT) pattern (inset of FIG. 1F) revealed a d-spacing of 0.34 nm, which was in good agreement with the $d_{011}$ distance of $H_2V_3O_8$.

$H_2V_3O_8$ NWs were also synthesized without adding graphene in the precursor to investigate the influence of graphene to the crystal growth. As confirmed by XRD (data not shown), the pristine $H_2V_3O_8$ NWs exhibited the same crystalline phase and lattice parameters with $H_2V_3O_8$ NW/graphene composite (Table 1).

TABLE 1

The lattice parameters calculated from the XRD curves.

| sample | a (nm) | b (nm) | c (nm) |
| --- | --- | --- | --- |
| $H_2V_3O_8$/graphene | 1.693(1) | 0.936(5) | 0.364(5) |
| Pristine $H_2V_3O_8$ | 1.693(2) | 0.935(7) | 0.364(6) |

SEM and TEM images revealed a small increase of NW thickness (~50 nm in average) when no graphene was present, indicating the NW growth was slightly limited with graphene coverage (data not shown). In addition, nitrogen adsorption-desorption isotherms characterization revealed that the Brunauer-Emmett-Teller (BET) surface area of the $H_2V_3O_8$ NW/graphene composite was 21.5 $cm^2\ g^{-1}$, which was much larger than the 14 $cm^2\ g^{-1}$ of the pristine $H_2V_3O_8$ NWs (data not shown). A larger surface area can increase the contact area between the electrolyte and active material. When dispersed in conductive additive pile for electrode preparation, the intimate contact between $H_2V_3O_8$ NWs and graphene was well preserved (data not shown), forming a three-dimensional conductive graphene network with a large quantity of active materials imbedded inside. The mass fraction of graphene in $H_2V_3O_8$ NW/graphene composite was estimated to be ~3.7 wt. % by Thermogravimetric Analysis (TGA) (data not shown).

Electrochemical Performance of $H_2V_3O_8$ NW/Graphene in ARZIBs

Figure 2A:
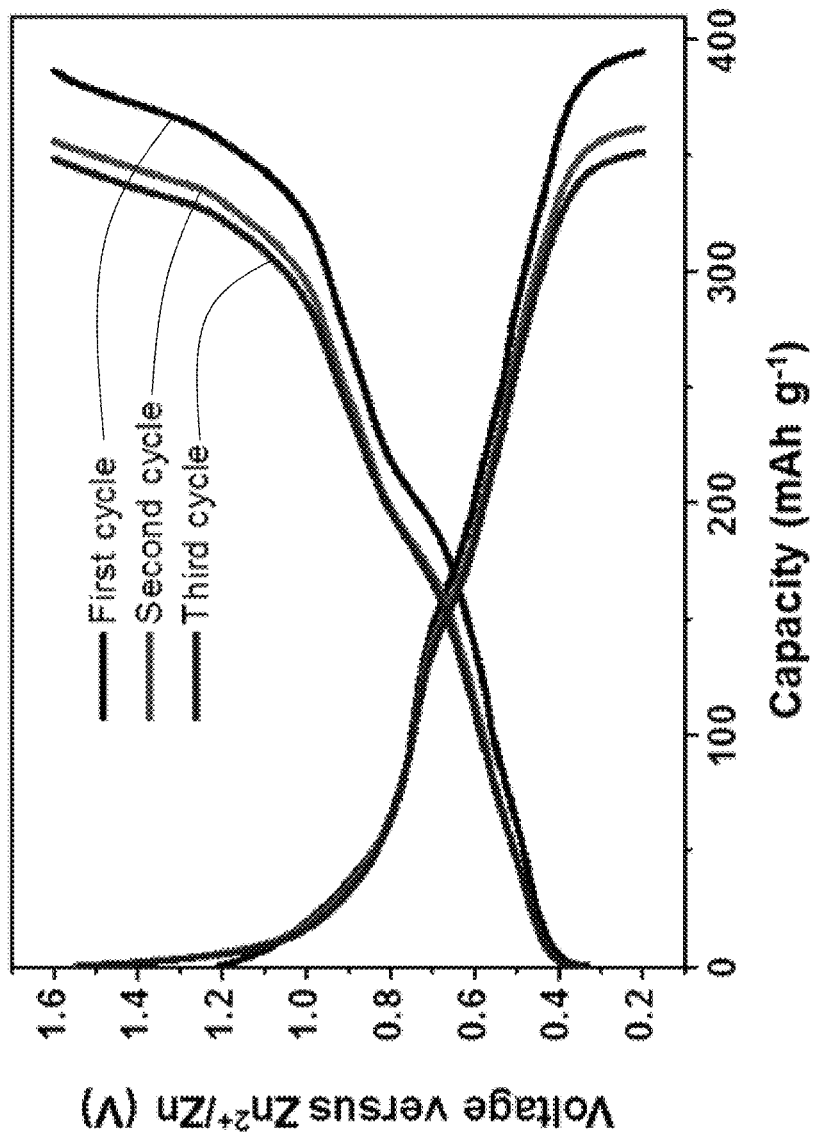
FIGS. 2A-2F depict the electrochemical performance of the $H_2V_3O_8$/graphene electrode.

The electrochemical performance of the $H_2V_3O_8$ NW/graphene composite electrodes was evaluated between 0.2-1.6 V (versus $Zn/Zn^{2+}$) in coin cell-type batteries using 3M $Zn(CF_3SO_3)_2$ aqueous solution as the electrolyte and zinc metal foil as the anode electrode. The first three charge-discharge profiles of the $H_2V_3O_8$/graphene electrode at a current rate of 1/3 C (1 C=300 mA $g^{-1}$, based on the stable capacity of ~300 mAh $g^{-1}$ at 300 mA $g^{-1}$) are shown in FIG. 2A. The first discharge capacity was 394 mAh $g^{-1}$. The charge capacity was 386 mAh $g^{-1}$ with an initial coulombic efficiency of 98%. The high coulombic efficiency indicated good reversibility of the $Zn^{2+}$ ions insertion/extraction process. The discharge profiles exhibited two distinct voltage plateaus between 0.8-0.6 V and 0.6-0.4 V, respectively. In the following charging processes, these two voltage plateaus remained in every profile. This phenomenon suggested that the electrochemical reactions might occur without irreversible crystal structure change in the subsequent cycles.

Figure 2B:
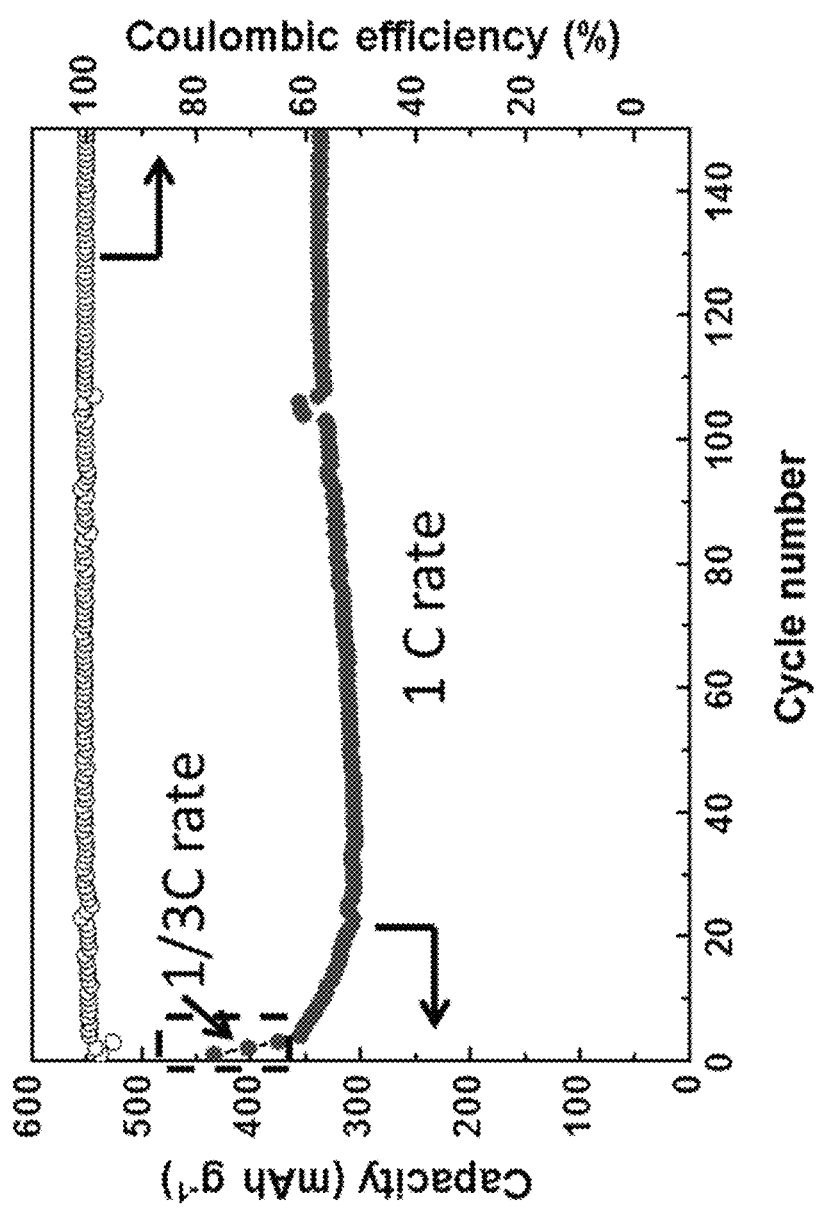
Figure 2C:
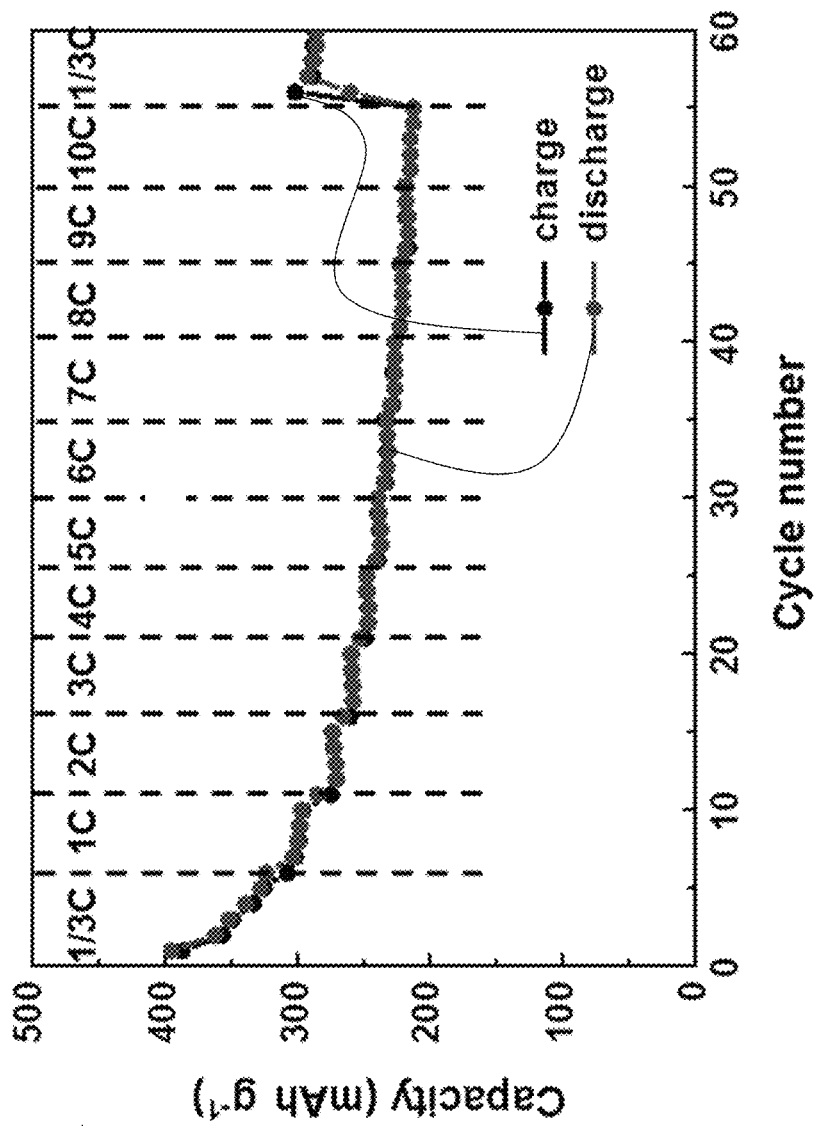
Figure 2D:
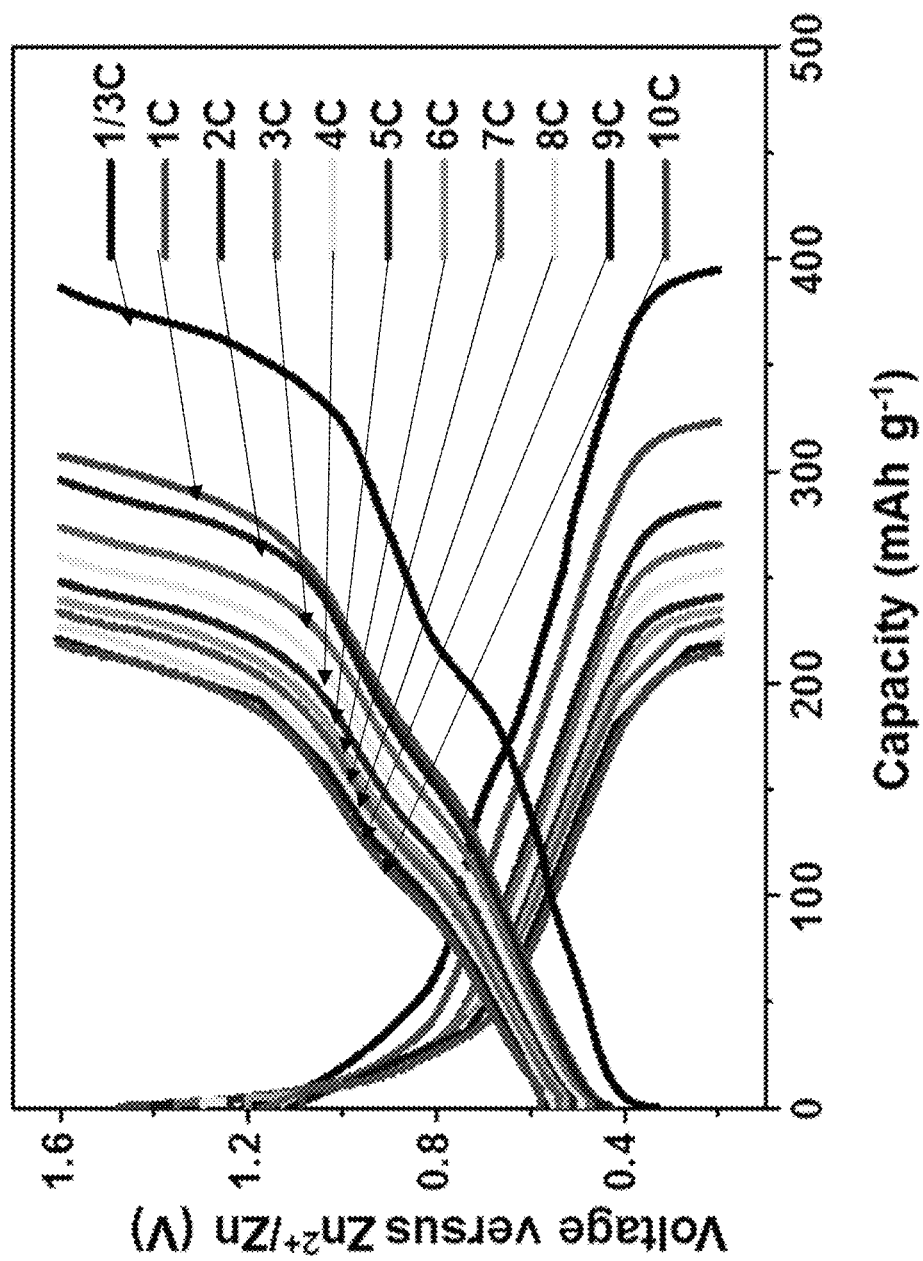
Figure 2E:
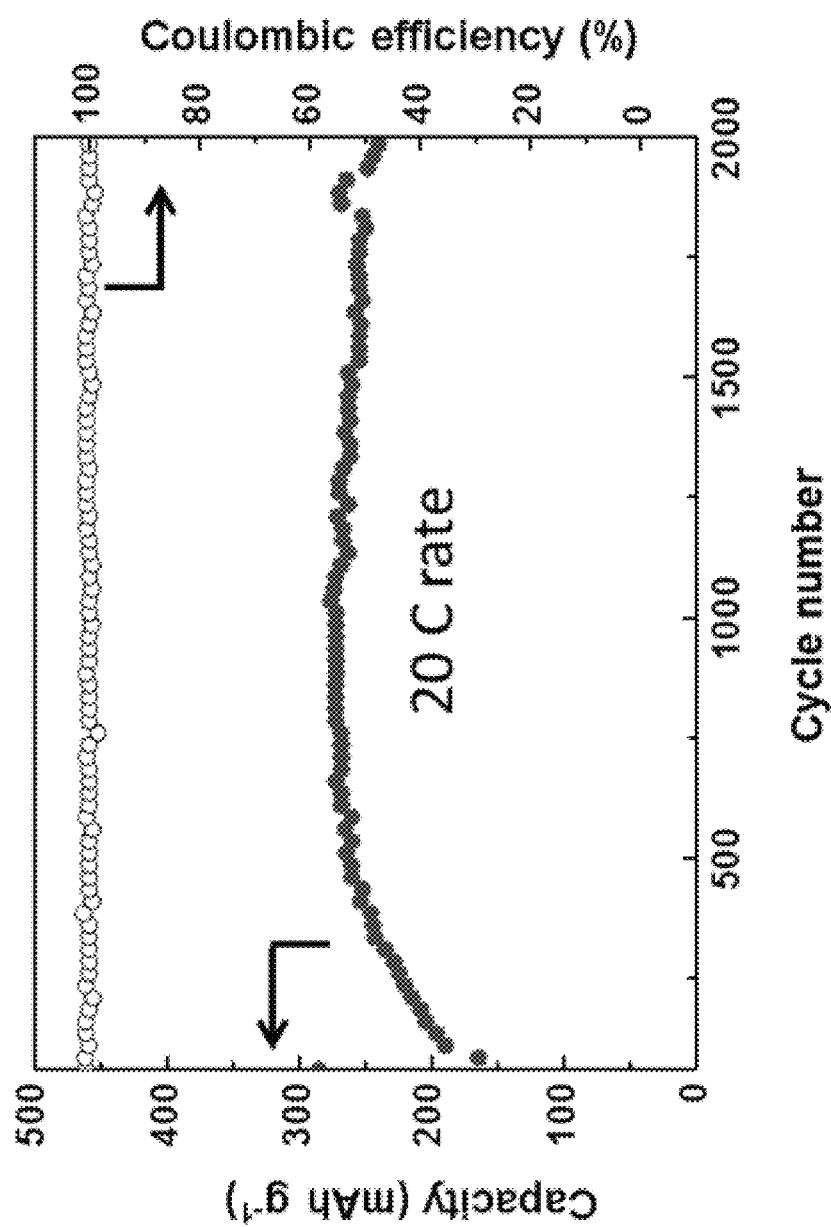
Figure 2F:
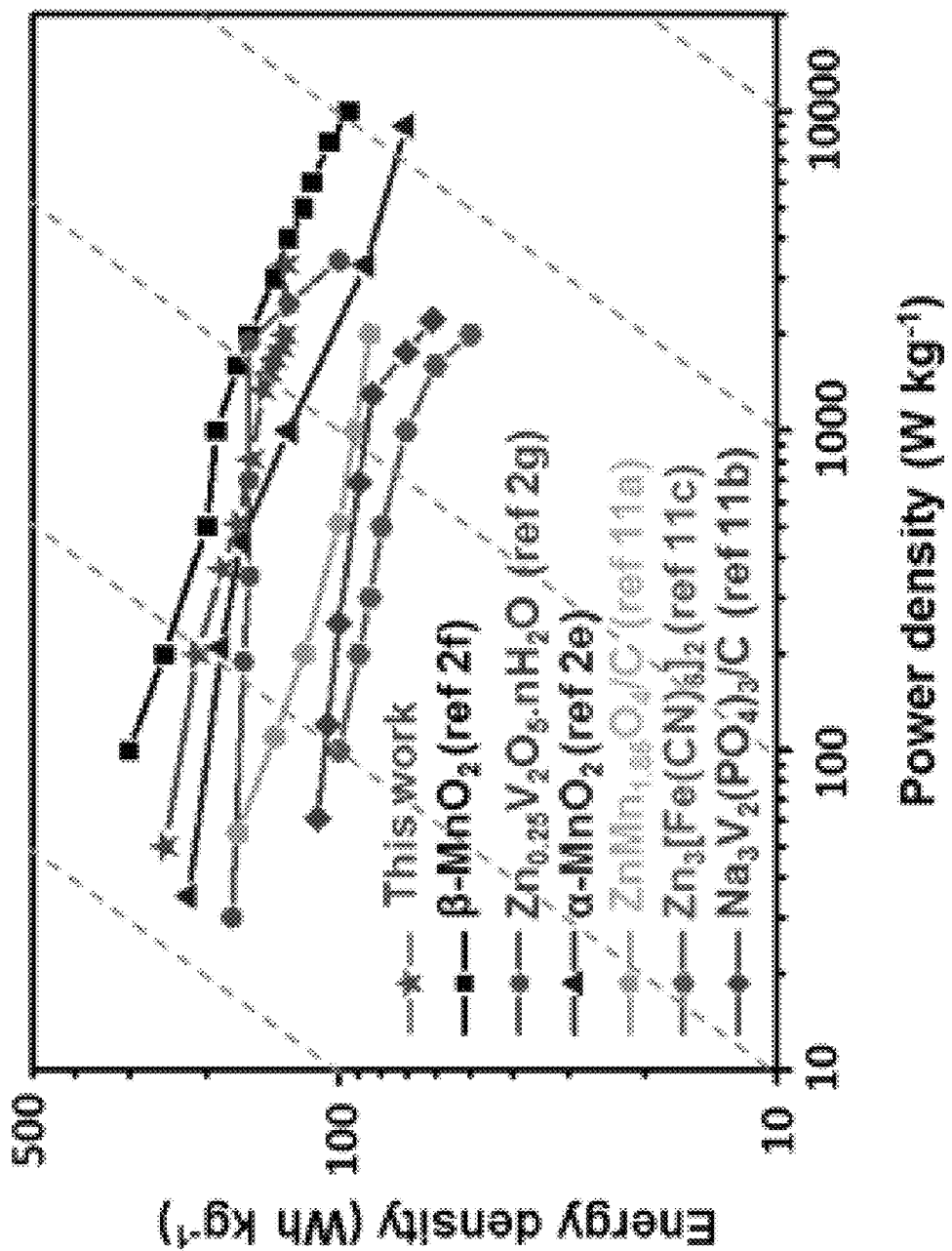

The cycling performance of the $H_2V_3O_8$ NW/graphene cell at a current rate of 1 C after three cycles activation at 1/3 C is shown in FIG. 2B. The activation process was implemented to ensure the charge/discharge reactions would occur deep (or fully) inside the electrode material lattice and thus avoid the capacity increase phenomenon during the initial cycles. The cell could deliver a specific discharge capacity of 336 mAh $g^{-1}$ with a 100% coulombic efficiency after 150 cycles, which is so far the highest capacity value among all reported zinc ion batteries with mild-acidic aqueous electrolyte (pH=3.55). The rate capability of the $H_2V_3O_8$ NW/graphene electrode was evaluated by increasing the current rate from 1/3 C to 10 C gradually (FIG. 2C). When the current rate was increased to 5 C, the cell could still deliver a capacity as high as 240 mAh $g^{-1}$. Impressively, when the current rate continued to be increased from 6 C to 10 C, the capacity almost remained nearly at the same value as 5 C. The specific capacities were 232, 227, 222, 218 and 215 mAh $g^{-1}$ from 6 C to 10 C, respectively. The discharge profiles at different current rates, especially at higher current rates, showed the same shape and small polarization (FIG. 2D), which was evidence of the fast charge transfer kinetics of the electrode. The durability and long cycling stability at a very high current rate (20 C) of the cell was studied after the rate capability test (FIG. 2E). In the first 700 cycles, the capacity gradually increased from ~200 mAh $g^{-1}$ to 270 mAh $g^{-1}$ and was maintained for ~400 cycles. Then, the capacity slowly decreased to 240 mAh $g^{-1}$ from the $1030^{th}$ to the $2000^{th}$ cycle, representing a high-capacity retention of 87% with respect to the highest value (276 m h $g^{-1}$ at $1030^{th}$ cycle). Compared to other state-of-the-art ARM systems (FIG. 2F),[2e-2g, 11] the $H_2V_3O_8$ NW/graphene composite exhibited a very competitive electrochemical performance. Specifically, the $H_2V_3O_8$ NW/graphene cathode was able to deliver 180 W h $kg^{-1}$ at a very high power density of 3800 W $kg^{-1}$ (calculated based on the cathode weight only) and a high volumetric energy density of 485 Wh $L^{-1}$ (calculated based on the cathode electrode only, data not shown). The weight energy density was significantly higher than other conventional aqueous energy storage systems, including a supercapacitor (<10 W h $kg^{-1}$)[12] aqueous lithium battery (50-80 W h $kg^{-1}$)[13] and an Ni-MH (20-80 W h $kg^{-1}$)[14] battery. Compared to the excellent electrochemical performance of the $H_2V_3O_8$ NW/graphene composite, the pristine $H_2V_3O_8$ NW only electrode showed an inferior performance, including lower discharge capacity of 230 mAh $g^{-1}$ at 1/3 C current rate after 60 cycles and poor rate performance of only 58.4 mAh $g^{-1}$ at 5 C (data not shown). This comparison revealed that graphene grafting not only improved the cyclic stability and rate capability of $H_2V_3O_8$ NWs, but also increased the discharge capacity by ~30 mAh $g^{-1}$. This enhancement can be attributed to the improved electrochemical kinetics of the electrode and the capacitive effect from the high specific area of the graphene sheet.[15, 16]

Figure 3B:
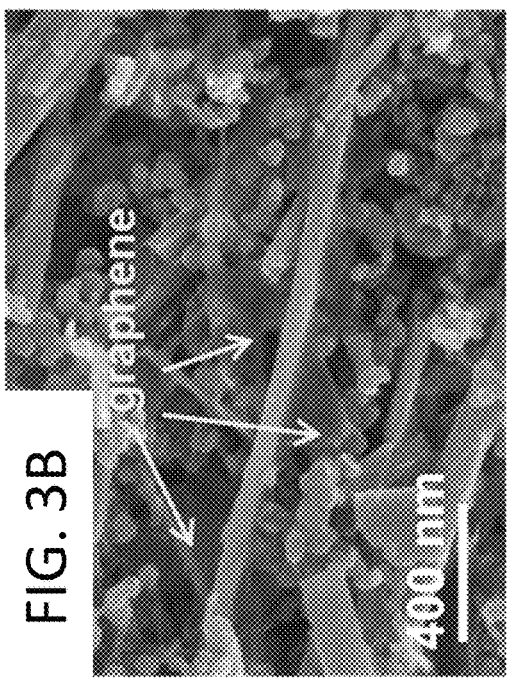
FIGS. 3A-3F depict an electron microscopy investigation of the post-cycling $H_2V_3O_8$ NW/graphene electrodes.
Figure 3A:
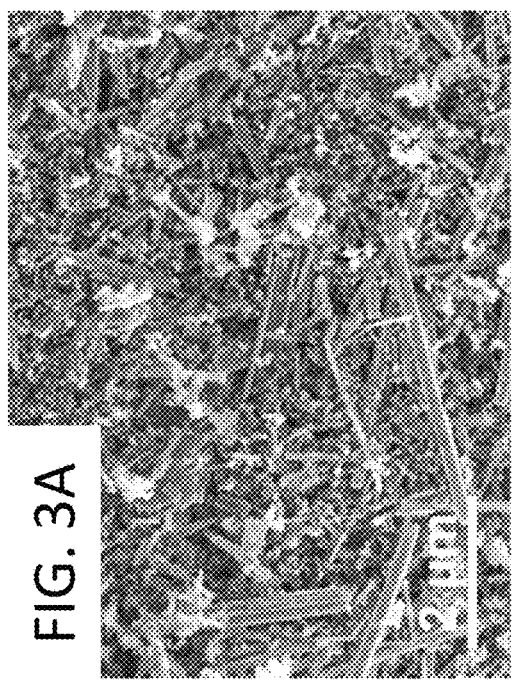
Figure 3C:
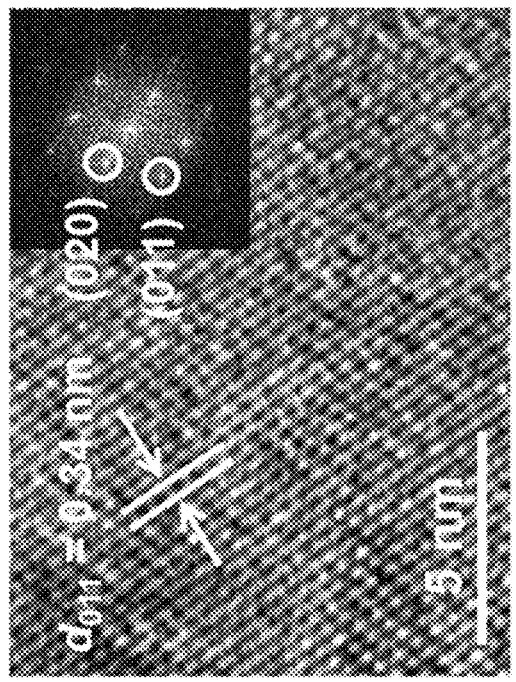
Figure 3E:
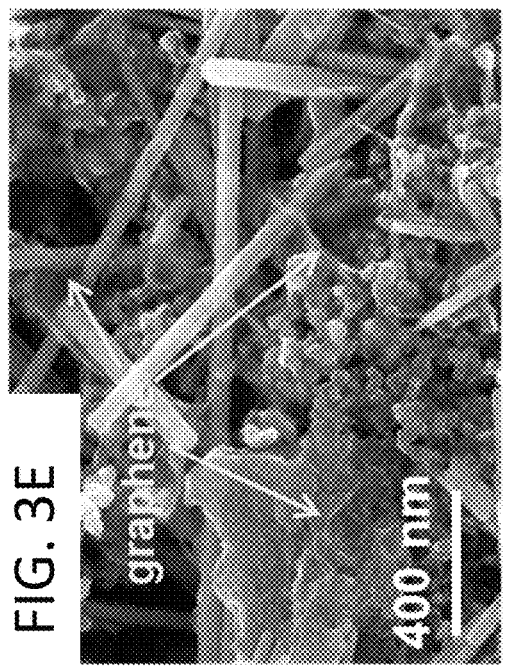
Figure 3D:
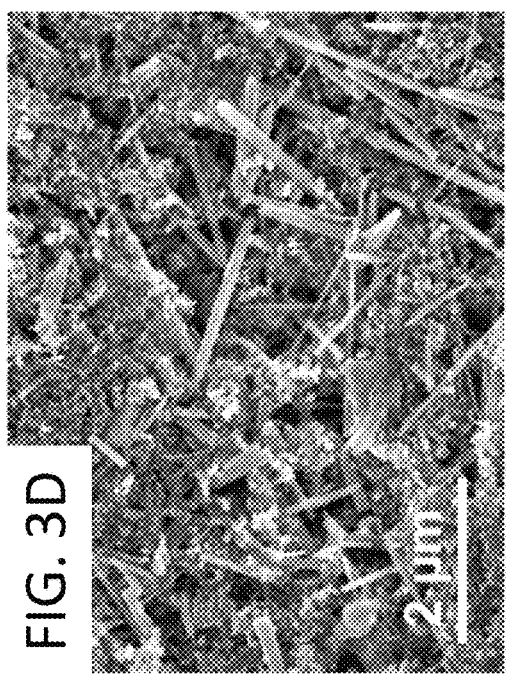
Figure 3F:
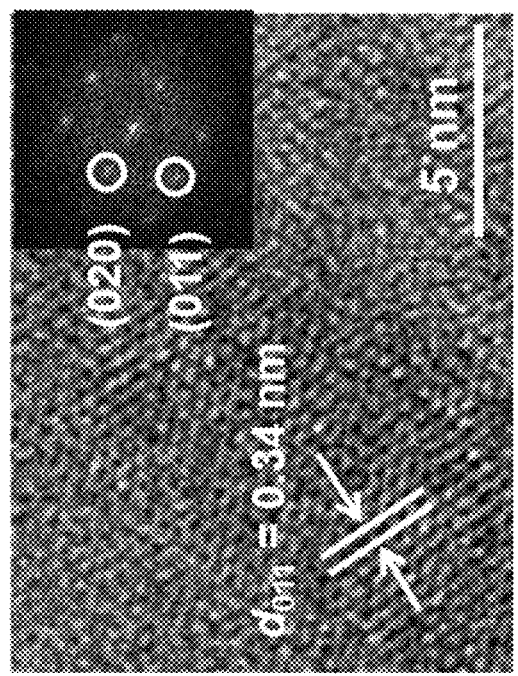

To reveal why the $H_2V_3O_8$ NW/graphene composite exhibited such a good electrochemical performance, the electrode configuration and crystal structure of the $H_2V_3O_8$ NW after different numbers of cycle were investigated by SEM and TEM. It was found that the composite configuration and NW morphology were preserved very well after short (FIGS. 3A and 3B) and long (FIGS. 3D and 3E) charge/discharge cycles, showing only reduced NW length after the cycles. The graphene sheets could be clearly observed after 2000 cycles, retaining a sound distribution within the NW network (FIGS. 3B and 3E). HRTEM images further showed that both cycled $H_2V_3O_8$ NWs retained the same high quality crystal lattice as the pristine samples (FIGS. 3C and 3F for 150 cycles at 1 C and 2000 cycles at 20 C, respectively). The XRD spectrum of the electrode after 2000 cycles still exhibited sharp diffraction peaks, indicating the high crystallinity of the electrode material was maintained (data not shown), which ensured high capacity retention during repeated charge/discharge processes. The reduced peak intensity of the (002) peak could be a result of the NW morphology change after long-term cycling (FIG. 3F), where most NWs turned into much shorter and fatter rods.

Electrochemical impedance spectroscopy (EIS) was then employed to understand the electrochemical kinetics of the composite electrodes (data not shown). Nyquist plots of the $H_2V_3O_8$ NW/graphene composite and pristine $H_2V_3O_8$ NW electrodes at the end of the first and 150$^{th}$ discharge all showed one semicircle, which could be assigned to the charge transfer resistance ($R_{ct}$) between the electrode interface and the electrolyte. The line slope could be attributed to ion diffusion in the bulk electrode. After the first discharge, the semicircle radius of the $H_2V_3O_8$ NW/graphene electrode was only slightly smaller than that of the pristine $H_2V_3O_8$ electrode. However, after 150 cycles, $R_{ct}$ of the $H_2V_3O_8$ NW/graphene electrode was almost twice smaller than that of pristine $H_2V_3O_8$ NW. Such a big difference demonstrated that the graphene conductive network played a significant role in improving the charge transfer kinetics of the electrode especially after large cycling numbers.

Mechanism of the Electrochemical Reaction

Ex-situ XRD spectra recorded at different cut-off voltages were used to investigate the structure evolution of the $H_2V_3O_8$ NW/graphene electrode during one charge/discharge cycle (FIGS. 4A and 4B). When the electrode was discharged to 0.8 V, no detectable shift of any diffraction peaks could be observed. This suggested that the structure of the electrode material during this operation period experienced no appreciable change when subjected to only a small amount of $Zn^{2+}$ ion insertion. With more $Zn^{2+}$ ions intercalated into the electrode from 0.6 V to 0.2 V, a shift of peaks toward a higher degree was observed. Magnified XRD curves of the (200) peak were examined (data not shown). The corresponding reduction of the interlayer distance from 0.84 nm to 0.81 nm is believed to be a result of the enhanced electrostatic attraction between two negatively charged $V_3O_8$ interlayers by positively charged $Zn^{2+}$ ions intercalation.[17, 18] Interestingly, when discharged to 0.5 V and 0.2 V, a few new peaks appeared gradually at 6.6°, 13°, 33.6° and 38.4°. The peak located at 6.6° corresponded to the interlayer distance of 1.34 nm. This could be attributed to the formation of a new phase with a much larger interlayer distance, as reported previously.[19, 20] At lower voltage, the intercalated $Zn^{2+}$ ions triggered the insertion of water molecules, while the lager interlayer distance might further improve the ion diffusion kinetics. The charging process with extraction of $Zn^{2+}$ ions from the electrode was the reverse of discharging. The fully charged electrode at 1.6 V showed the same pure $H_2V_3O_8$ phase again as the pristine electrode. Such a highly repeatable series of ex-situ XRD spectra revealed the excellent reversibility of the electrochemical reactions and thus the impressively long cycling stability.

Figure 4C:
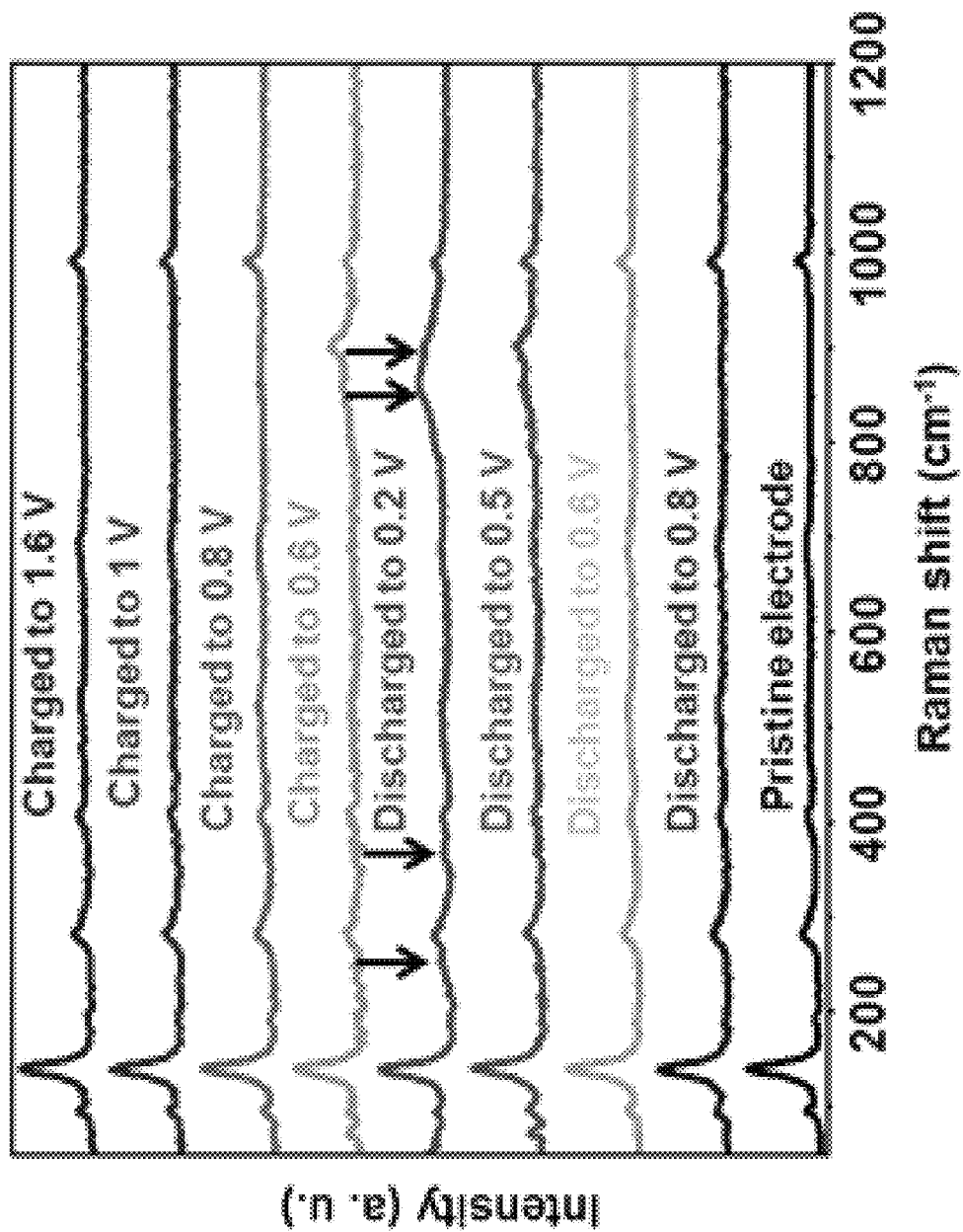

Raman spectra in the wavelength range of 50-1200 cm$^{-1}$ were further used to demonstrate the electrochemical mechanism (FIG. 4C). The peaks of the pristine electrode located at 141, 281.5, 410.7, 688.4, and 997 cm$^{-1}$ could be assigned to various V—O bonds in $H_2V_3O_8$.[21] When discharged to 0.5 V and 0.2 V, a series of new peaks located at 253 and 368, 866 and 920 cm$^{-1}$ appeared. The peaks at 866 and 920 cm$^{-1}$ could be attributed to V—O vibrations in the hydrated vanadium oxides.[22, 23] The peaks at 253 and 368 cm$^{-1}$ were caused by the vibrations of Zn—O bonds.[24] When charged back to 1.6 V, all of the new peaks disappeared. In accordance with XRD analysis, the Raman spectra further confirmed the mechanism of $Zn^{2+}$ and water co-intercalation.

XPS analysis provided additional evidence of $Zn^{2+}$ and water co-intercalation from the valence changes of zinc, oxygen and vanadium. As shown in FIG. 4C, no Zn element signal was detected from the pristine electrode. When discharged to 0.2 V, the electrode exhibited three Zn $2p_{3/2}$ peak components. The one located at 1023.7 eV could be attributed to the absorbed $Zn^{2+}$ ions on the surface of graphene sheets and $H_2V_3O_8$ NWs. Another two peaks appeared at 1026.7 eV and 1028.3 eV, corresponding to the intercalated $Zn^{2+}$ with different coordination. When the electrode was charged to 1.6 V, only a single Zn $2p_{3/2}$ peak corresponding to surface absorption remained. Quantitative elemental analysis data revealed a lower amount of the remaining $Zn^{2+}$ (Table 2).

TABLE 2

Zn/V compositions obtained from XPS analysis for the pristine and fully discharged/charged electrodes.

| Electrode | Pristine electrode | discharged to 0.2 V | Charged to 1.6 V |
| --- | --- | --- | --- |
| Zn atom/V atom | 0 | 2.11/3 | 0.30/3 |

Figure 4E:
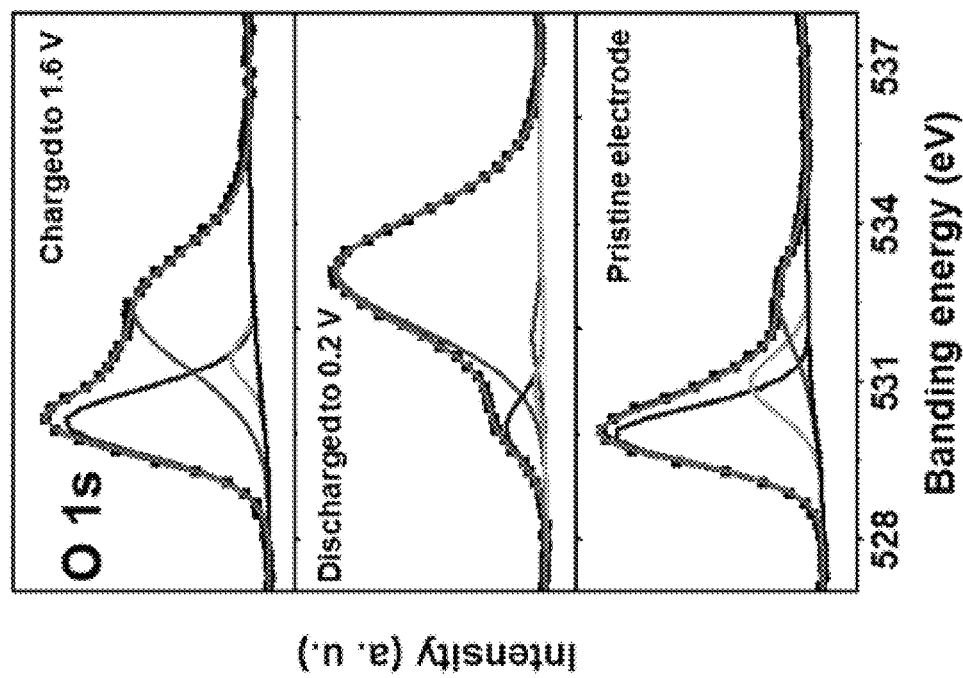
Figure 4F:
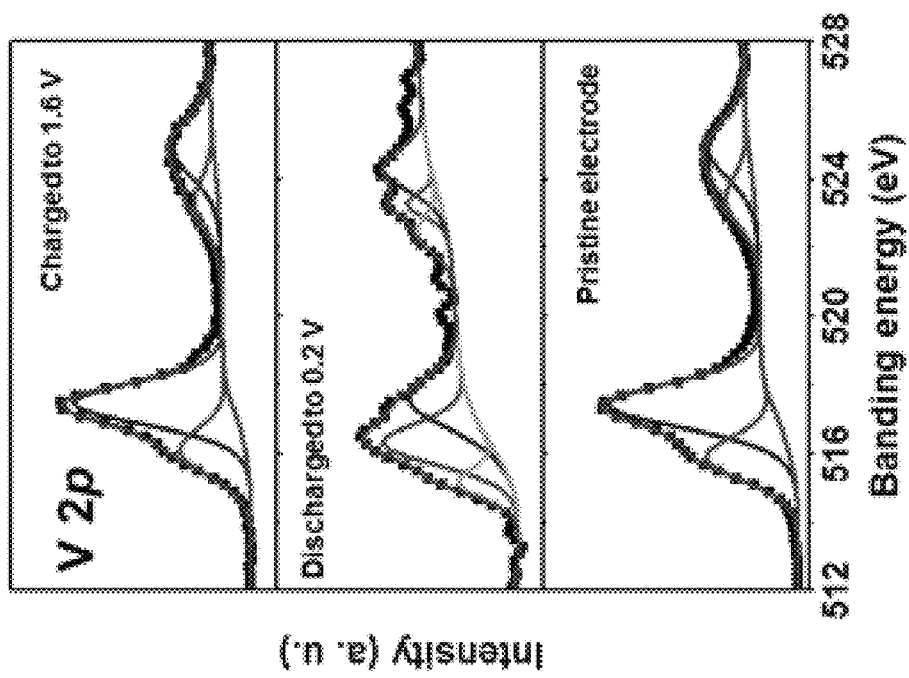

The high efficiency of $Zn^{2+}$ insertion/extraction into/from the electrode agreed with the high coulombic efficiency of the batteries. In the pristine and fully charged electrodes, the O 1 s region could be fitted into three peaks as shown in FIG. 4D. The peaks located at lower energy of 529.9 and 530.9 eV could be assigned to the O 1 s in $VO_6$ octahedrons and $VO_5$ trigonal bipyramids, respectively. The one at 532.6 eV could be assigned to O 1 s between the V—O layers.[25] However, a new broad peak appeared at 533.1 eV when the electrode was discharged to 0.2 V. The new peak could be assigned to O 1 s in $H_2O$,[27] in accordance with the insertion of water molecules in the crystal, which did not contribute to the capacity. Moreover, as shown in FIG. 4E, the V $2p_{3/2}$ signal in the pristine electrode could be divided into two peaks at 515.9 and 517.4 eV, corresponding to $V^{4+}$ and $V^{5+}$, respectively. The peak area ratio of $V^{4+}$ and $V^{5+}$ was 1:2, which agreed well with the theoretical value. With the intercalation of $Zn^{2+}$, a new peak located at 515.1 eV corresponding to $V^{3+}$ appeared and the proportion of $V^{4+}$ increased as the $V^{5+}$ component decreasing. The average valance of vanadium, calculated based on the area ratio, was reduced from 4.67 to 3.7. Therefore, 2.91 charges per formula unit were accessible for electrochemical reactions, which were responsible for the large zinc storage capacity (~280 mAh g$^{-1}$). Additional capacity could come from the emergence of new phase and surface adsorption.

Figure 5A:
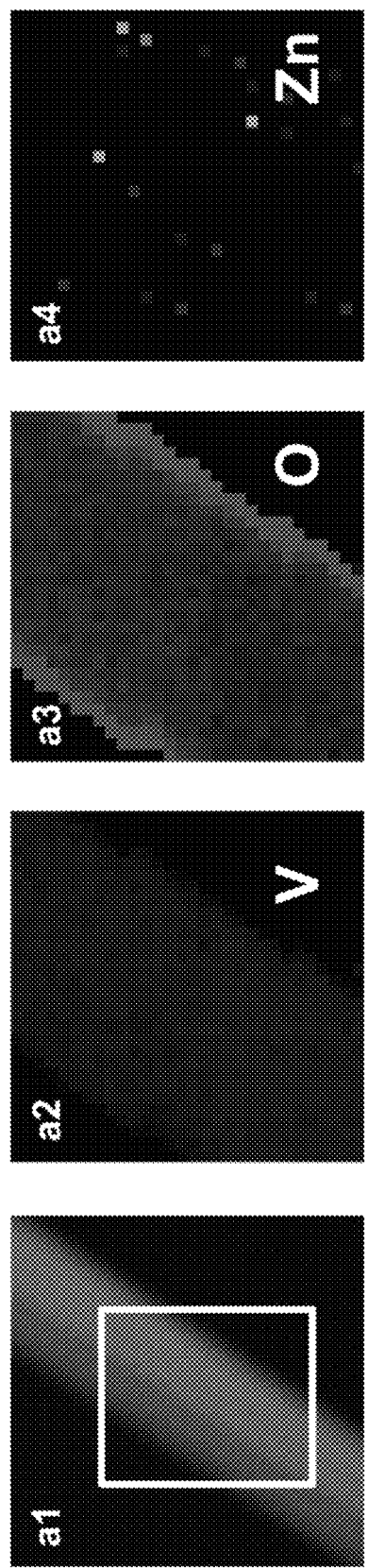
Figure 5B:
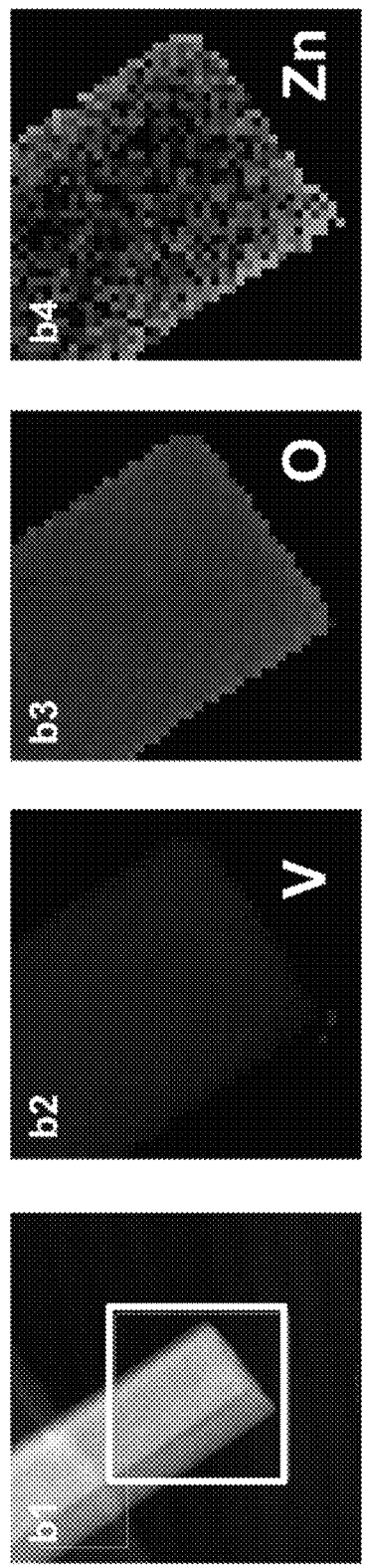
Figure 5G:
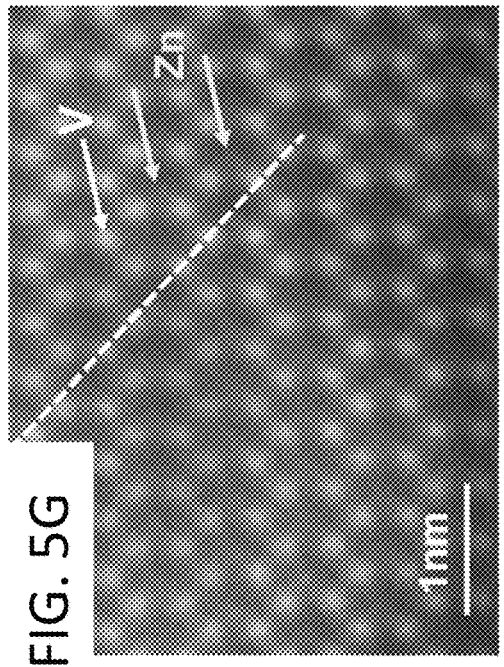
Figure 5F:
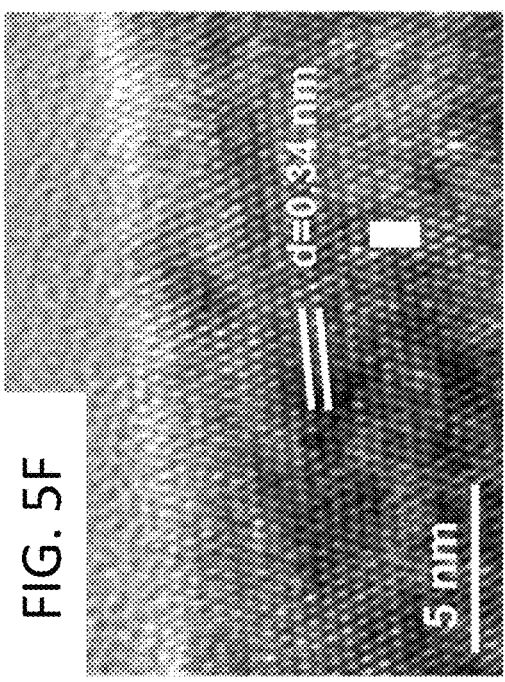
Figure 5H:
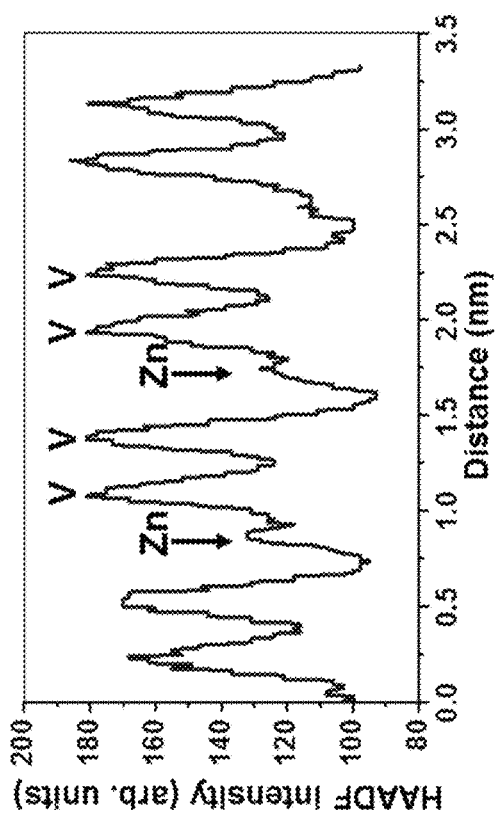
Figure 5J:
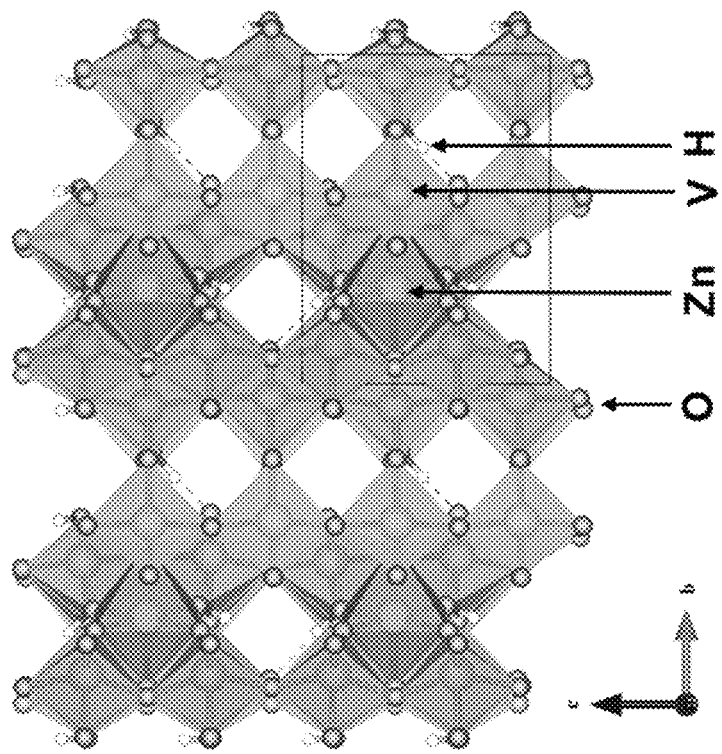
Figure 5I:
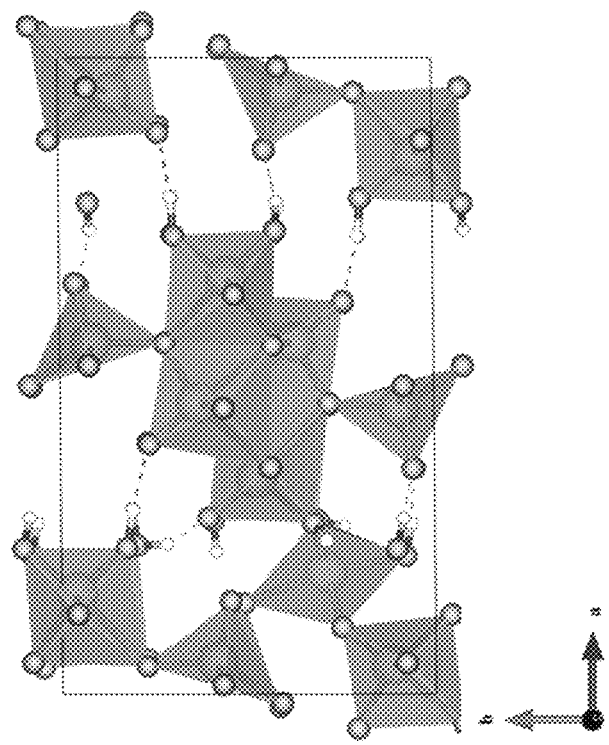

An atomic-level study of the $Zn^{2+}$ intercalation was conducted by TEM, STEM and EELS to further understand the high rate performance of the $H_2V_3O_8$ NW/graphene electrode. In a pristine $H_2V_3O_8$ NW, as shown in FIG. 5A, EELS mapping showed a uniform elemental distribution of both O and V elements, confirming the good stoichiometry of the NW structure. No Zn signal was detected from the pristine NW. For a $Zn^{2+}$ ion-intercalated NW (discharged to 0.2 V, FIG. 5B), while both O and V elements still remained the same intensity distribution, significant amount of Zn element signal was detected across the entire NW body with an obviously high concentration along the NW edge, indicating more $Zn^{2+}$ ions were stored on the surface and along the edge of the NW. TEM of the NW after the first discharge showed that the NW was composed of two different phases (FIG. 5C). A new phase with an interlayer distance of 1.34 nm was observed distributing longitudinally along the NW axial direction (FIG. 5D). HRTEM revealed that it was the typical structure of bilayered $Zn_xV_2O_5 \cdot nH_2O$.[26, 27] As schematically shown in FIG. 5E, the $Zn^{2+}$ ions and water molecules were inserted between the $V_2O_5$ bilayers. Other parts of the NW still remained the original $H_2V_3O_8$ phase, with negligible change of the lattice spacing (FIG. 5F). This was in good agreement with the insignificant XRD peak shift. High-precision, high-angle annular dark field (HAADF) STEM experiments were further acquired from the $H_2V_3O_8$ phase region following approaches developed by Yankovich.[28] The STEM image series was acquired, including 300 frames using 512×512 pixels and the pixel dwell time was ~2 µs. As shown in FIG. 5G, additional HAADF signals could be observed inside some quasi-hexagons of V atoms (yellow arrows). FIG. 5G shows the intensity line scan along the dashed line in the HAADF image. Clear shoulders could be observed adjacent to the V dumbbells, which were likely to be intercalated $Zn^{2+}$ sites. DFT calculations showed that Zn was stable at the center of the vacant sites, with slight distortion to neighboring V atoms (FIGS. 5I and 5J). This was also observed in the HAADF image. From a 2D Gaussian fitting with projected interatomic distances marked (data not shown), additional Zn HAADF signal could be located inside the V quasi-hexagon, together with a slight distortion of neighboring V atoms. STEM analysis and DFT calculation suggested that the rows of vacancy sites between V—O octahedrons could accommodate the intercalation of $Zn^{2+}$ ions with very small lattice distortion, offering fast $Zn^{2+}$ diffusion channels with minimal kinetic energy barrier, and thus the ultrahigh rate capability.

CONCLUSION

In this example, a novel $H_2V_3O_8$ NW/graphene composite was developed as a cathode material for ARZIBs. The composite was synthesized by a one-step hydrothermal method, offering a great potential for low-cost and large-scale manufacturing. This one-step synthesis strategy enabled a uniform mixture and intimate contact between the $H_2V_3O_8$ NWs and graphene surfaces, which significantly improved the charge transfer kinetics and stability of the composite electrode. The high quality $H_2V_3O_8$ NW crystal structure allowed rapid and reversible $Zn^{2+}$ intercalation/extraction. Therefore, the $H_2V_3O_8$ NW/graphene composite exhibited a large specific capacity of 394 mAh g$^{-1}$ at 1/3 C, a high-rate capability of 270 mAh g$^{-1}$ at 20 C, and excellent cycling stability of more than 2000 cycles. The crystal evolution and electrochemical mechanism of $Zn^{2+}$ and water co-intercalation were systematically investigated by ex-situ XRD, Raman and XPS spectra. HRTEM image revealed the emergence of a new bilayered phase as a result of heavy co-insertion of $Zn^{2+}$ ions and water molecules. STEM analysis suggested that the $Zn^{2+}$ ions were located at the vacancy sites between V—O octahedrons, which might be responsible for the ultra-high rate capability. Combining the advantages of zinc metal anode and mild-acidic aqueous electrolyte, this ARM system holds great potential for large-scale energy storage applications with low price, excellent safety and high durability.

REFERENCES

[1] J. Liu, J. Zhang, Z. Yang, J. P. Lemmon, C. Imhoff, G. L. Graff, L. Li, J. Hu, C. Wang, J. Xiao, G. Xia, V. V. Viswanathan, S. Baskaran, V. Sprenkle, X. Li, Y. Shao, B. Schwenzer, *Adv. Funct. Mater.* 2013, 23, 929.

[2] a) L. Suo, O. Borodin, T. Gao, M. Olguin, J. Ho, X. Fan, C. Luo, C. Wang, K. Xu, *Science* 2015, 350, 938; b) Z. Li, D. Young, K. Xiang, W. C. Carter, Y. Chiang, *Adv. Energy Mater.* 2013, 3, 290; c) C. D. Wessells, S. V. Peddada, R. A. Huggins, Y. Cui, *Nano Lett.* 2011, 11, 5421; d) P. Saha, M. K. Datta, O. I. Velikokhatnyi, A. Manivannan, D. Alman, P. N. Kumta, *Prog. Mater. Sci.* 2014, 66, 1; e) H. Pan, Y. Shao, P. Yan, Y. Cheng, K. S. Han, Z. Nie, C. Wang, J. Yang, X. Li, P. Bhattacharya, K. T. Mueller, J. Liu, *Nat. Energy* 2016, 1, 16039; f) N. Zhang, F. Cheng, J. Liu, L. Wang, X. Long, X. Liu, F. Li, J. Chen, *Nat. Comm.* 2017, 8(1), 405. g) D. Kundu, B. D. Adams, V. Duffort, S. H. Vajargah, L. F. Nazar, *Nat. Energy* 2016, 1, 16119.

[3] a) T. Gupta, A. Kim, S. Phadke, S. Biswas, T. Luong, B. J. Hertzberg, M. Chamoun, K. Evans-Lutterodt, D. A. Steingart, *J. Power Sources* 2016, 305, 22; b) L. Zhang, L. Chen, X. Zhou, Z. Liu, *Adv. Energy Mater.* 2015, 5, 1400930; c) Z. Jia, B. Wang, Y. Wang, *Mater. Chem. Phys.* 2015, 149, 601; d) M. H. Alfaruqi, V. Mathew, J. Gim, S. Kim, J. Song, J. P. Baboo, S. H. Choi, J. Kim, *Chem. Mater.* 2015, 27, 3609; e) P. Senguttuvan, S. Han, S. Kim, A. L. Lipson, S. Tepavcevic, T. T. Fister, I. D. Bloom, A. K. Burrell, C. S. Johnson, *Adv. Energy Mater.* 2016, 6, 1600826; f) M. H. Alfaruqi, V. Mathew, J. Song, S. Kim, S. Islam, D. T. Pham, J. Jo, S. Kim, J. P. Baboo, Z. Xiu, K. Lee, Y. Sun, J. Kim, *Chem. Mater.* 2017, 29, 1684.

[4] Y. Wang, G. Cao, *Adv. Mater.* 2008, 20, 2251.

[5] M. Ko, S. Chae, S. Jeong, P. Oh, J. Cho, *ACS nano* 2014, 8, 8591.

[6] H. Qiao, X. Zhu, Z. Zheng, L. Liu, L. Zhang, *Electrochem. Commun.* 2006, 8, 21.

[7] Y. Oka, T. Yao, N. Yamamoto, *J. of Solid State Chem.* 1990, 89, 372.

[8] H. Li, T. Zhai, P. He, Y. Wang, E. Hosonoa, H. Zhou, *J. Mater. Chem.* 2011, 21, 1780.

[9] C. Tsang, A. Manthiram, *J. Electrochem. Soc.* 1997, 144, 520.

[10] D. Yang, A. Velamakanni, G. Bozoklu, S. Park, M. Stoller, R. D. Piner, S. Stankovich, I. Jung, D. A. Field, C. A. Ventrice Jr., R. S. Ruoff, *Carbon* 2009, 47, 145.

[11] a) N. Zhang, F. Cheng, Y. Liu, Q. Zhao, K. Lei, Ch. Chen, X. Liu, J. Chen, *J. Am. Chem. Soc.* 2016, 138, 12894; b) G. Li, Z. Yang, Y. Jiang, W. Zhang, Y. Huang, *J. Power Sources*, 2016, 308, 52; c) L. Zhang, L. Chen, X. Zhou, Z. Liu, *Adv. Energy Mater.* 2015, 5, 1400930.

[12] P. Simon, Y. Gogotsi, *Nat. mater.* 2008, 7, 845.

[13] J. Y. Luo, W. J. Cui, P. He, Y. Y. Xia, *Nat. chem.* 2010, 2, 760.

[14] W. Tang, Y. Zhu, Y. Hou, L. Liu, Y. Wu, K. P. Loh, H. Zhang, K. Zhu, *Energy Environ. Sci.* 2013, 6, 2093.

[15] R. Raccichini, A. Varzi, S. Passerini, B. Scrosati, *Nat. Mater.* 2015, 14, 271.

[16] G. Kucinskis, G. Bajars, J. Kleperis, *J. Power Sources* 2013, 240, 66.

[17] M. R. Lukatskaya, O. Mashtalir, C. E. Ren, Y. Dall'Agnese, P. Rozier, P. L. Taberna, M. Naguib, P. Simon, M. W. Barsoum, Y. Gogotsi, *Science* 2013, 341, 1502.

[18] D. S. Charles, M. Feygenson, K. Page, J. Neuefeind, W. Xu, X. Teng, *Nat. commun.* 2017, 8, 15520.

[19] D. Buchholz, L. G. Chagas, C. Vaalma, L. Wu, S. Passerini, *J. Mater. Chem. A* 2014, 2, 13415.

[20] C. T. Lin, D. P. Chen, P. Lemmens, X. N. Zhang, A. Maljuk, P. X. Zhang, *J. Cryst. Growth* 2005, 275, 606.

[21] K. Zhu, X. Yan, Y. Zhang, Y. Wang, A. Su, X. Bie, D. Zhang, F. Du, C. Wang, G. Chen, Y. Wei, *ChemPlusChem* 2014, 79, 447.

[22] F. D. Hardcastle, I. E. Wachs, *J. Phys. Chem.* 1991, 95, 5031.

[23] S. Ni, G. Zhou, S. Lin, X. Wang, Q. Pan, F. Yang, D. He, *Mater. Lett.* 2009, 63, 2459.

[24] W. W. Rudolph, C. C. Pye, *J. solution chem.* 1999, 28, 1045.

[25] I. Mjejri, N. Etteyeb, F. Sediri, *J. Alloys Compd.* 2014, 611, 372.

[26] S. Tepavcevic, H. Xiong, V. R. Stamenkovic, X. Zuo, M. Balasubramanian, V. B. Prakapenka, C. S. Johnson, T. Rajh, *ACS nano* 2012, 6, 530.

[27] G. S. Gautam, P. Canepa, W. D. Richards, R. Malik, G. Ceder, *Nano Lett.* 2016, 16, 2426.

[28] A. B. Yankovich, B. Berkels, W. Dahmen, P. Binev, S. I. Sanchez, S. A. Bradley, A. Li, I. Szlufarska, P. M. Voyles, *Nat. Commun.* 2014, 5, 4155.

[29] Y. Xu, H. Bai, G. Lu, C. Li, G. Shi, *J. Am. Chem. Soc.* 2008, 130, 5856.

[30] Y. Li, Z. Hu, Y. Ding, J. Kan, *Int. J. Electrochem. Sci.*, 2016, 11, 1898.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An aqueous rechargeable zinc ion battery comprising:
   a cathode comprising a $V_3O_7 \cdot H_2O$-graphene composite, the composite comprising a plurality of $V_3O_7 \cdot H_2O$ nanostructures in contact with graphene,
   an anode in electrical communication with the cathode, the anode comprising zinc, and
   an aqueous electrolyte between the cathode and the anode, the aqueous electrolyte comprising zinc ions and an ether of a type and providing a total amount of ether in the aqueous electrolyte, the type and the total amount selected to maximize a capacity retention value of the battery wherein the total amount of ether is in a range from 1 vol. % to 5 vol. %.

2. The battery of claim 1, wherein the $V_3O_7 \cdot H_2O$ nanostructures are $V_3O_7 \cdot H_2O$ nanowires.

3. The battery of claim 1, wherein the ether is selected from diethyl ether, dimethyl ether, and tetrahydrofuran.

4. The battery of claim 1, wherein the ether is selected from diethyl ether, dimethyl ether, and tetrahydrofuran and the amount of ether is in a range of from 1 vol. % to 5 vol. %.

5. The battery of claim 1, wherein the capacity retention value of the battery is at least 80% at 20 C and after 2000 cycles.

6. The battery of claim 1, wherein the capacity retention value of the battery is at least 85% at 20 C and after 2000 cycles.

7. The battery of claim 6, wherein the battery is characterized by one or both of: a specific capacity of at least 375 mAh $g^{-1}$ at 1/3 C and a rate capability of at least 250 mAh $g^{-1}$ at 20 C.

8. The battery of claim 7, wherein the battery is characterized by both the specific capacity of at least 375 mAh $g^{-1}$ at 1/3 C and the rate capability of at least 250 mAh $g^{-1}$ at 20 C.

9. An aqueous rechargeable zinc ion battery comprising:
   a cathode comprising a $V_3O_7 \cdot H_2O$-graphene composite, the composite comprising a plurality of $V_3O_7 \cdot H_2O$ nanowires in contact with graphene,
   an anode in electrical communication with the cathode, the anode comprising zinc, and
   an aqueous electrolyte between the cathode and the anode, the aqueous electrolyte comprising zinc ions and an ether providing a total amount of ether in the aqueous electrolyte in a range of from 1 vol. % to 5 vol. %.

10. The battery of claim 9, wherein the ether is selected from diethyl ether, dimethyl ether, and tetrahydrofuran.

11. The battery of claim 9, wherein the battery is characterized by a capacity retention value of at least 80% at 20 C and after 2000 cycles.

12. The battery of claim 9, wherein the battery is characterized by a capacity retention value of at least 85% at 20 C and after 2000 cycles.

13. The battery of claim 12, wherein the battery is characterized by one or both of: a specific capacity of at least 375 mAh $g^{-1}$ at 1/3 C and a rate capability of at least 250 mAh $g^{-1}$ at 20 C.

14. The battery of claim 13, wherein the battery is characterized by both the specific capacity of at least 375 mAh $g^{-1}$ at 1/3 C and the rate capability of at least 250 mAh $g^{-1}$ at 20 C.

15. The battery of claim 1, wherein the ether is diethyl ether.

16. The battery of claim 9, wherein the ether is diethyl ether.

* * * * *

UNITED STATES PATENT AND TRADEMARK OFFICE
CERTIFICATE OF CORRECTION

| | | |
|---|---|---|
| PATENT NO. | : 10,476,111 B2 | Page 1 of 1 |
| APPLICATION NO. | : 15/810903 | |
| DATED | : November 12, 2019 | |
| INVENTOR(S) | : Xudong Wang et al. | |

It is certified that error appears in the above-identified patent and that said Letters Patent is hereby corrected as shown below:

In the Specification

Column 1, Line 30:
Delete the phrase "$Mg^{2+}$ and $Zn^{2-}$ systems." and replace with --$Mg^{2+}$ and $Zn^{2+}$ systems.--.

Column 10, Line 25:
Delete the phrase "Compared to other state-of-the-art ARM systems" and replace with --Compared to other state-of-the-art ARZIB systems--.

Column 13, Line 60:
Delete the phrase "this ARM system holds great potential" and replace with --this ARZIB system holds great potential--.

Signed and Sealed this
Twenty-fourth Day of December, 2019

Andrei Iancu
*Director of the United States Patent and Trademark Office*